US008812649B2

(12) United States Patent
Adams, Jr. et al.

(10) Patent No.: US 8,812,649 B2
(45) Date of Patent: *Aug. 19, 2014

(54) METHOD AND SYSTEM FOR PROCESSING FAULT ALARMS AND TROUBLE TICKETS IN A MANAGED NETWORK SERVICES SYSTEM

(75) Inventors: Frank Paul Adams, Jr., Colorado Springs, CO (US); Sanjiv Purushottam Damle, Colorado Springs, CO (US); Richard Brian Drescher, Colorado Springs, CO (US); Joshua Jerome Morris, Colorado Springs, CO (US); Michael Robert Smith, Monument, CO (US); Stephen Michael Smith, Raleigh, NC (US); Jonathan Lyle Spieker, Colorado Springs, CO (US); Christopher Lawson White, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2196 days.

This patent is subject to a terminal disclaimer.

(21) Appl. No.: 11/317,882

(22) Filed: Dec. 23, 2005

(65) Prior Publication Data

US 2006/0233311 A1 Oct. 19, 2006

Related U.S. Application Data

(60) Provisional application No. 60/671,899, filed on Apr. 14, 2005.

(51) Int. Cl.
G06F 15/173 (2006.01)
H04L 12/24 (2006.01)
H04L 12/26 (2006.01)

(52) U.S. Cl.
CPC .......... H04L 41/5074 (2013.01); H04L 41/507 (2013.01); H04L 41/50 (2013.01); H04L 41/0654 (2013.01); H04L 41/0659 (2013.01); H04L 12/2419 (2013.01); H04L 12/2602 (2013.01); H04L 12/2408 (2013.01); H04L 12/24 (2013.01); H04L 12/2422 (2013.01)
USPC .......................................... 709/224; 709/225

(58) Field of Classification Search
CPC ... H04L 41/5074; H04L 41/507; H04L 41/50; H04L 41/0654; H04L 41/0659; H04L 12/2419; H04L 12/2422; H04L 12/2602; H04L 12/2408; H04L 12/24; H04L 67/125
USPC .................................... 709/223, 224
See application file for complete search history.

(56) References Cited

U.S. PATENT DOCUMENTS

| 6,587,543 | B1 * | 7/2003 | Howard et al. ............ 379/10.01 |
| 7,120,633 | B1 * | 10/2006 | Kromer ............................ 707/8 |
| 2002/0078017 | A1 * | 6/2002 | Cerami et al. ..................... 707/1 |
| 2002/0087680 | A1 * | 7/2002 | Cerami et al. .................. 709/224 |
| 2003/0149919 | A1 * | 8/2003 | Greenwald et al. ............. 714/43 |
| 2004/0078693 | A1 * | 4/2004 | Kellett ............................ 714/38 |
| 2006/0126801 | A1 * | 6/2006 | Laperi et al. ................ 379/32.01 |

\* cited by examiner

Primary Examiner — Tom Y Chang

(57) ABSTRACT

An approach for supporting automated fault isolation and recovery is provided. An alarm indicative of a fault within a customer network is received. An event within a workflow is created in response to the alarm, wherein a new trouble ticket is generated as part of the workflow. Communication with a trouble management system is performed to correlate the alarm with an existing trouble ticket. The new trouble ticket is associated with the existing trouble ticket.

12 Claims, 18 Drawing Sheets

METHOD AND SYSTEM FOR PROCESSING FAULT ALARMS AND TROUBLE TICKETS IN A MANAGED NETWORK SERVICES SYSTEM

RELATED APPLICATIONS

This application is related to, and claims the benefit of the earlier filing date under 35 U.S.C. §119(e) of, U.S. Provisional Patent Application Ser. No. 60/671,899, filed Apr. 14, 2005, entitled "Network Management System with Automated Fault Isolation"; the entirety of which is incorporated herein by reference.

BACKGROUND OF THE INVENTION

Modern communication systems involve a delicate interplay of network components that support voice and data services. These systems are vital to business operations, such that downtime imposes a significant cost to the business. Ensuring that networks perform to their architected availability and mitigating the risk of downtime are key drivers for information managers. Whether the infrastructure is supporting e-commerce, regulatory compliance reports, supply chain management, or even internal electronic mail, loss of connectivity has a severe impact. For example, as applications, such as complex ordering, billing and communication systems, have been added to the Internet Protocol (IP) ensuring that networks remain connected and available is of key concern. The impact of network failures (even very minor ones lasting only minutes) can be measured in thousands or even millions of dollars. The ability to quickly identify faults and restore network connectivity are critical to helping companies meet and exceed their business objectives. Consequently, network monitoring systems are needed to detect network anomalies, stemming from network component failure, cable cuts, etc.

Network monitoring involves receiving and interpreting a multitude of alarms that are assigned to various network components. These alarms are triggered when anomalies are detected in their respective components. Monitoring systems provide these alarms in form of reports for network analysts (or network monitors) to analyze the cause of the network anomaly and to manually initiate action to resolve the cause. Such resolution can also entail manually interfacing with multiple disparate systems.

Given the size of modern networks, the number of alarms can be unmanageable. That is, the network monitors may be inundated periodically with alarm reports stemming from a major network problem, or even a series of small anomalies arising within a short time span. These events can thus trigger a tremendous volume of alarm reports, which can overwhelm the network surveillance engineers and hamper the process of restoring the network. Reducing the restoration time per network event can translate into significant savings to the customer.

In conventional network monitoring environments, network surveillance engineers receive alarm reports from the telecommunications network and then manually process these alarm reports. Processing an alarm report involves an orderly procedure for resolving the anomaly that generated an alarm. The processing of alarm reports to resolve network anomalies can require retrieving network parameter information, such as equipment operating characteristics from paper manuals; consulting telephone directories to find telephone numbers for remote network sites; collection configuration information from the network equipment associated with the trouble; and completing electronic telecommunications trouble forms, referred to as trouble tickets or service reports.

A network surveillance engineer prepares a trouble ticket (or service report) when action by a field engineer appears necessary. Field engineers are typically telecommunications personnel who service the telecommunications network (e.g., replacing a faulty component at a specific location).

Traditionally, organizations and businesses have resorted to addressing the daunting, costly task of network monitoring and maintenance on their own. These "Do-It-Yourself (DIY)" organizations assume the heavy financial costs associated with hardware, software and human capital of network management systems. Moreover, these customer organizations are generally are ill equipped to fully diagnose the problems caused or contributed by third parties (e.g., Local Exchange Carriers (LECs))—i.e., they lack end-to-end visibility.

Based on the foregoing, there is a need for integrating and automating the processes and systems to provide fault detection and recovery of communications networks. There is also a need for an approach to provide rapid fault isolation and resolution.

SUMMARY OF THE INVENTION

These and other needs are addressed by the present invention, in which an approach for performing automated fault isolation and/or resolution is provided.

According to one aspect of the present invention, a method for providing automated fault isolation is disclosed. The method includes receiving an alarm indicative of a fault within a customer network. The method also includes creating an event within a workflow in response to the alarm, wherein a new trouble ticket is generated as part of the workflow. Additionally, the method includes communicating with a trouble management system to correlate the alarm with an existing trouble ticket. Further, the method includes associating the new trouble ticket with the existing trouble ticket.

According to another aspect of the present invention, a system for providing automated fault isolation is disclosed. The system includes an automation engine configured to receive an alarm indicative of a fault within a customer network. The system also includes a workflow engine configured to create an event within a workflow in response to the alarm, wherein a new trouble ticket is generated as part of the workflow. The workflow engine is further configured to communicate with a trouble management system to correlate the alarm with an existing trouble ticket, and to associate the new trouble ticket with the existing trouble ticket.

According to another aspect of the present invention, a method for providing automated fault isolation is disclosed. The method includes receiving alarm information, from an automated system, associated with an alarm indicative of a fault within a customer network. The automated system is configured to create an event within a workflow in response to the alarm and to generate a new trouble ticket as part of the workflow. The method also includes retrieving an existing trouble ticket among a plurality of existing trouble tickets based on the alarm information. Further, the method includes transmitting information about the existing trouble ticket to the automated system to correlate the alarm with the existing trouble ticket, wherein the automated system is further configured to associate the new trouble ticket with the existing trouble ticket.

According to yet another aspect of the present invention, a system for providing automated fault isolation is disclosed. The system includes a communication interface configured to receive alarm information, from an automated system, associated with an alarm indicative of a fault within a customer network. The automated system is configured to create an event within a workflow in response to the alarm and to generate a new trouble ticket as part of the workflow. The system also includes a processor configured to retrieve an existing trouble ticket among a plurality of existing trouble tickets based on the alarm information. The information about the existing trouble ticket is transmitted to the automated system to correlate the alarm with the existing trouble ticket, and the automated system is further configured to associate the new trouble ticket with the existing trouble ticket Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF THE PREFERRED EMBODIMENT

An apparatus, method, and software for providing fault isolation and/or resolution as part of a managed services network are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various embodiments of the present invention are described with respect to providing automated fault isolation and/or recovery in a managed services context, it is contemplated that these embodiments have applicability to systems operated solely by customer organizations.

Figure 1A:
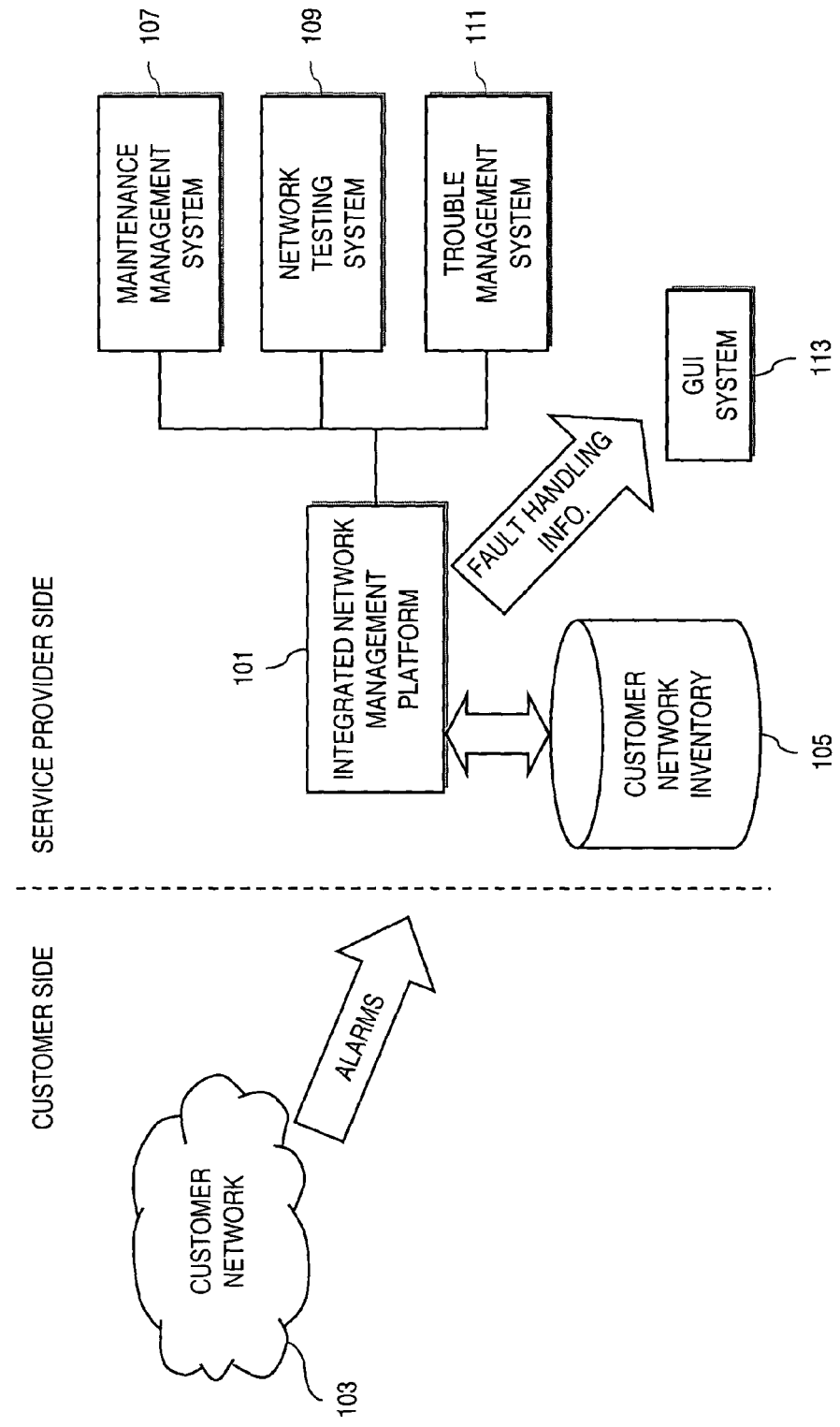
FIGS. 1A-1C are diagrams, respectively, of a managed services system for providing fault isolation, according to various embodiments of the present invention.
Figure 1B:
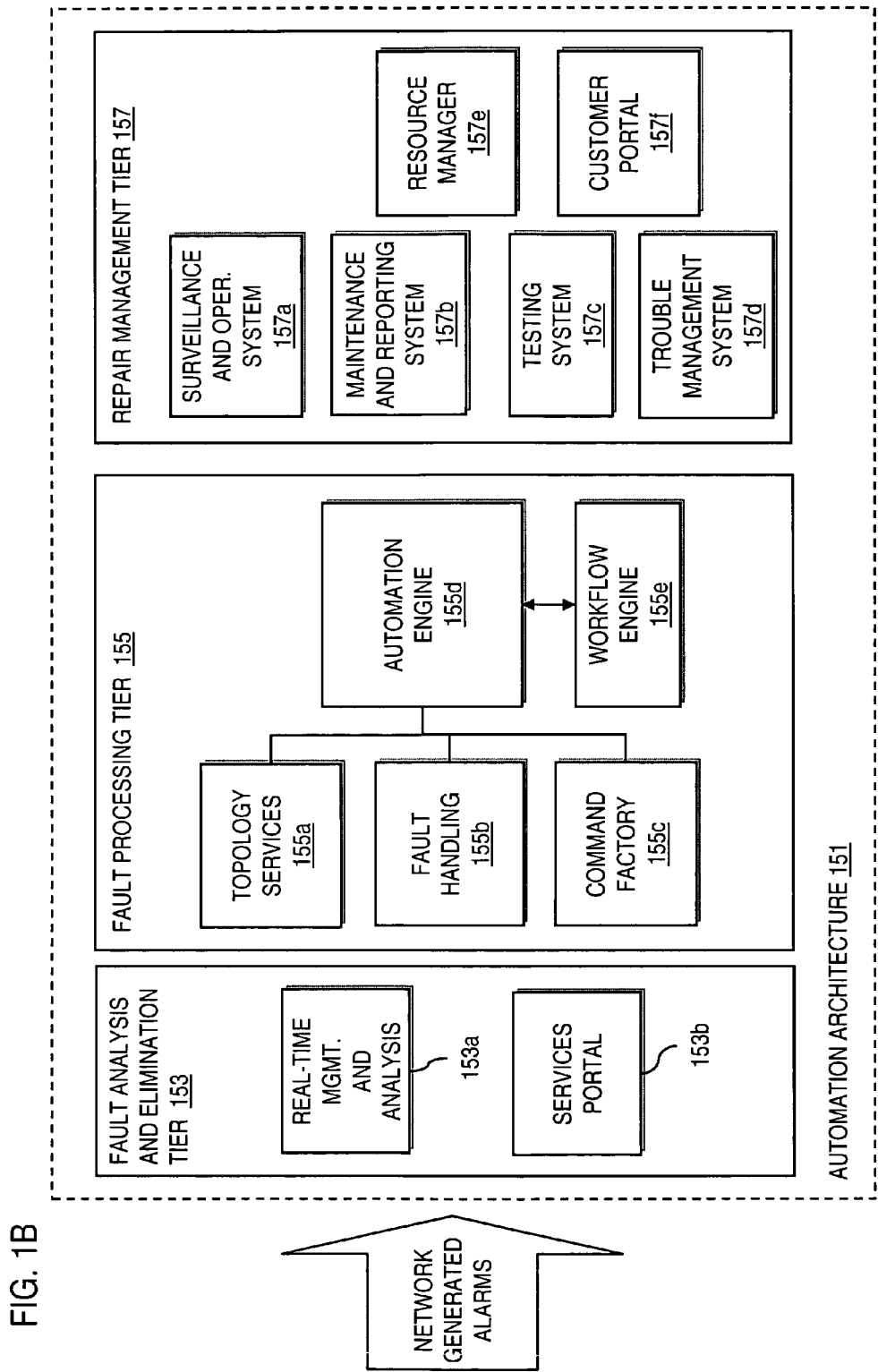
Figure 1C:
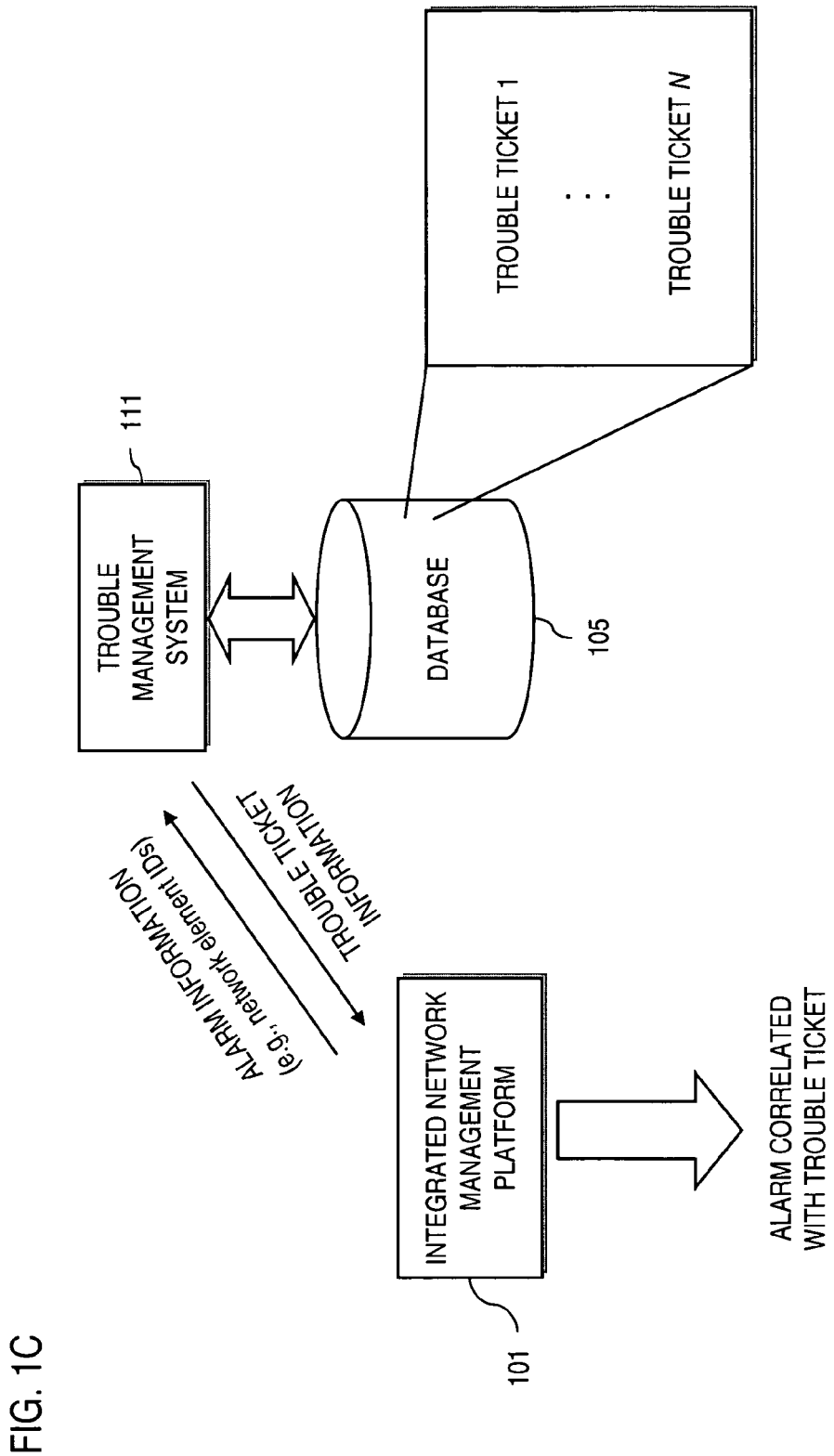

FIGS. 1A-1C are diagrams, respectively, of a managed services system for providing fault isolation, according to various embodiments of the present invention. A managed services system 100 (shown in FIG. 1A) employs a workflow application, as executed by an integrated network management platform 101, to automate many of the initial actions needed in response to a fault alarm affecting a managed network. The system 100 possesses an automation architecture, which is more fully described below with respect to FIG. 2, for collection and pre-processing of alarm information using an external process. The automation process (or engine) gathers topology and customer specific information for use in reacting to the alarm. Conditional invocation of automation based on customer preferences is supported. An automation "script" can be applied depending on the nature of the alarm. The automation engine also communicates with maintenance and trouble ticket management systems to determine correlation of the fault alarm. Additionally, automatic initiation of data retrieval and testing services, which can be subject to customer preferences and the nature of the alarm, are supported. Further, the system 100 provides automatic reporting of status of the automated process to various users (e.g., surveillance engineer and customer); the customer has the capability to dynamically specify when and how they are to be contacted. A monitor service for continual monitoring and reporting on the alarm state is offered by the system, whereby trouble tickets can be re-opened, and the automation process re-initiated as needed.

According to one embodiment of the present invention, fault isolation and network resolution/recovery capabilities are described as a managed service offered by a network service provider (e.g., a carrier) in the system 100. It is recognized that network service providers, compared to customer organizations, have greater end-to-end view of communications because they control the backbone. Consequently, these service providers can identify network events and isolate faults quickly, without having to "wait" for assistance or resolution by other parties, regardless of whether the problem occurs in the customer network, an access link, or the core network.

To support fault isolation and network resolution/recovery capabilities, the integrated network management platform 101 can serve one or more customer networks, such as network 103. The integrated network management platform 101 interfaces with various element management and network management systems to provide a unified view of network problems to network management personnel. The platform 101 provides numerous features that can enhance productivity for the network analyst. These features, for example, include workflow, ticketing, topology information, task automation, command interaction capabilities, as well as interfaces to several internal systems for maintenance activities, outage notifications, and contact information.

The integrated network management platform 101 accordingly can serve as a global account manager to provide user authentication services, including a single sign-on capability as well as workstation independence. Access privileges and configurable application data for save/restore user session profiles are also supported. The platform 101 additionally provides a common repository for user, group, application, and resource data, along with the associated security settings, and an Application Programming Interface (API) for managing a variety of information. The platform 101 can adopt network security policies, and support automated application updates. Further, the integrated network management platform 101 provides a front-end web portal, according to one embodiment of the present invention.

In an exemplary embodiment, the platform 101 has a JAVA® 2 Enterprise Edition (J2EE) application framework to leverage its support for database connectivity, transaction processing, and directory services in a reliable and secure environment.

The customer (or managed) network 103, in an exemplary embodiment, can be an enterprise network providing voice and/or data services for the enterprise. For instance, the customer network 103 can be an Internet Protocol (IP)-based network supporting data communication as well as IP telephony; it is noted any variety of local area network (LAN) and wide area network (WAN) technologies can be deployed within the network 103—e.g., Asynchronous Transfer Mode (ATM), Ethernet-based, etc.

On the service provider side, the management platform 101 has access to a customer network inventory database 105, which stores information (as necessary for performing fault isolation) about the network components of the customer network 103.

The management platform 101 interfaces with various systems, including a maintenance management system 107, a network testing system 109, and a trouble management system 111. The platform 101, thus, provides the ability to discover or store the topology of the customer network 103, review alarms/events on the network 103, eliminate events from consideration due to pre-determined maintenance windows and correlate the alarms into significant events.

Also, the management platform 101 supports an automation engine that engages the appropriate test scripts based upon the event to further isolate the problem. Customer Premise Equipment (CPE) of the network 103 are polled (through, for example, out-of-band access if connectivity has been lost), and test points across the network 103 as well as the backbone network (not shown) are checked at all appropriate locations including at a Local Exchange Carrier (LEC) network. These automated end-to-end checks can be performed simultaneously, without human intervention, resulting in a trouble ticket if necessary. After testing, a single report is generated, capturing the conclusion of all the testing. The report can then be provided to an analyst (e.g., a Network Operations Control (NOC) engineer or personnel of the service provider), who can then work on the restoration of the network 103.

As shown, alarms and/or events are generated by the customer network 103, and forwarded to the management platform 101. At any time during the process of resolving the fault within the customer network 103, a user (e.g., network administrator, etc.) in the customer organization can retrieve information about the fault via a graphical user interface (GUI) system 113. This GUI system 113 can be a web browser or a local network management platform.

As mentioned earlier, in the DIY approach, the customer would have to perform a number of manual steps. For example, the administrator would need to view all the alarms across the network, and correlate the alarms into distinguishing events (i.e., topology correlation). Also, the administrator may need to obtain information from the network components by dialing out-of-band into a CPE to evaluate the health of the CPE. If the CPE is not the cause of the fault, the administrator can then contact the circuit provider to explain the problem and to identify the troubled location/site. The circuit provider may subsequently open a trouble ticket for handling by a field technician. The technician can then initiate the appropriate tests to diagnose the fault. At this point, there can be confusion regarding who is responsible for the problem.

According to one embodiment of the present invention, the integrated network management platform 101 can provide personnel of the service provider with a central tool that automates numerous functions for the technician. These functions can include fault detection and root cause determination for CPE reported failures; customer and circuit identification; trouble ticket creation, update and closure; and maintenance check. Also, the functions can include end-to-end alarm correlation and testing, for example, based upon circuit identifiers (IDs); ticket referral; fix verification (alarm clear and ticket refer-back); and customer notification and interaction.

As described above, the platform 101 enables an integrated, automated approach to fault isolation and resolution. As shown in FIG. 1B, for the purposes of explanation, the platform 101 possesses an automation architecture 151 comprising three tiers: a fault analysis and elimination tier 153, a fault processing tier 155, and a repair management tier 157.

The fault analysis and elimination tier 153 of the architecture effectively provides a user interface (e.g., graphical user interfaces (GUIs)) via a real-time management and analysis module 153*a* and a services portal 153*b*. This tier 153 provides GUIs that are used to interact with alarms, tickets, and workflow events that exist within the system 100. Tier 153 also has the ability to call web links directly to both the systems of the repair management tier 157 as well as other business processes, which can provide access to detailed information and business functions when needed.

The services portal 153*b* provides an interface to the customer for the following capabilities: project management, order management, change management, network management, activity completion reporting and service provisioning for managed services. The portal 153*b* can possess an associated database (not shown) for managed services customer premise equipment as well as, for example, related customer contact data, IP addresses, operations process and service level agreements, maintenance agreements, etc.

The services portal 153*b* is also capable of receiving service order information. The portal 153*b* maintains knowledge of related circuit connections corresponding to the managed CPE. Alternate carrier circuit information is also supported.

According to one embodiment of the present invention, the services portal 153*b* employs a web services eXtensible Mark-up Language (XML) interface. This interface can provide access to services portal data, including customer and site contact information, procedures at customer and site level, CPE detail, circuit numbers, change management activities, IP addressing, alert status, etc.

Further, the services portal 153*b* can accommodate network devices that are shared by multiple customers to support services, such as virtual routers and virtual firewalls, in which customers are assigned private network services that are provided by shared devices. Additionally, the services portal 153*b* can obtain and present backbone edge router port/interface configurations upon demand and include this information with network configuration inquiries from the topology services module 155*a* or the command factory 155*c*. It is noted that audit circuit information and port/interface configuration between edge routers and customer CPE can be conducted on a regular basis (e.g., periodically). Inconsistent data will either result in automated updates or notification of the specific contact within the services portal 153*b* for that customer.

The fault analysis and elimination tier 153 can comprise a collection of network and element management platforms that provide direct management of network elements. The systems within this tier 153 can communicate with the fault processing tier 155, which serves as a manager of managers, via a common XML based information exchange model and Common Object Request Broker Architecture (CORBA) communications bus architecture, for example.

To appreciate the present invention, it is instructive to discuss briefly the CORBA specification as well as object-oriented technology in general. CORBA is a specification that enables software modules to communicate with other software modules in other programs, even if the two programs are written in different programming languages and are running on different platforms. A software component is an individual modular software routine that has been compiled and dynamically linked, and is ready for use with other software components and programs. A software component has an intended purpose, which is to perform a specified function or functions. A software application is a collection of software components and an application facilitates the interaction between software components using the underlying communications infrastructure.

In a CORBA environment, a program makes a request for services of software modules through an Object Request Broker (ORB), and thus, does not need to know the design and composition of the program, which includes the software. In client/server applications, an ORB is an interface to which the client makes a request for service from a software object.

In an object-oriented programming environment, a client is defined as a member of a class or group that uses the services of another class or group to which the client is not related by way of inheritance from a common class or group. More generally, a client is a software module that requests a service provided by another software module. The client uses the requested service without having to know any working details about the other software module or the service. In a network environment, a server is defined as a computer or program that responds to commands from a client.

In a large enterprise such as a corporation, enterprise computing is the use of computers in a network or series of interconnected networks that generally encompass a variety of different platforms, operating systems, protocols, and network architectures. Middleware is software that is transparent to a user, which takes two or more applications and makes them work seamlessly together. With middleware technology, a user can design an ordinary component to provide its regular function, and then insert an appropriate middleware mix when the component is built or created at run time. For instance, CORBA is a middleware project.

A CORBA object bus defines the design of the resident components and how these components communicate with one another. CORBA was designed to allow intelligent components to discover each other and interoperate on an object bus. However, CORBA goes beyond interoperability. CORBA also specifies an extensive set of bus-related services for creating and deleting software objects, accessing them by name, storing them in persistent stores, externalizing their states, and defining ad hoc relationships between them.

CORBA software objects are components of intelligence that may reside anywhere on a network. They are packaged as binary components which remote clients may access via method invocations. Both the language and compiler used to create server software objects are transparent to clients. Clients have no need to know where the distributed software object resides or on what operating system it executes. The distributed software object may be in the same process or on a machine that sits across a large network. Additionally, clients have no need to know how a server software object is implemented. For example, a server software object may be implemented, for example, as a set of JAVA® classes, or it may be implemented as a large COBOL (Common Business-Oriented Language) program. The client only needs to know the interface its server software object publishes. The interface then serves as a binding contract between clients and servers.

The fault analysis and elimination tier 153 can provide the following services to the fault processing tier 155: highly reliable fault and performance data collection, command and control of the network elements, alarm reduction (e.g., root cause analysis), a common CORBA XML interface to the fault processing tier 155, and synchronization between tiers 153 and 155.

The fault processing tier 155 plays a central role within the automation architecture, functioning as a manager of managers, incorporating business logic that support network management activities. In particular, the tier 155 includes a topology services module 155a, a fault handling module 155b, a command factory 155c, an automation engine 155d, and a workflow engine 155e. This tier 155 enables the integration of network reported fault indications from the repair management tier 157 systems and provides value-added common business process features. Consequently, efficient service restoration and equipment repair tracking are attained.

Specifically, the fault processing tier 155 provides the following services through one or more combinations of the modules 155a-155e. For instance, the topology services module 155a provides an interface to several external databases for accurate and timely topology and customer correlation to events being generated in the network 103. The fault handling module 155b provides fault/event data repository and reporting services, such as storing the alarms and events and all associated data as well provides user reporting capabilities. The command factory module 155c provides the ability to interact with managed elements in the network 103.

The primary functions of the topology services module 155a include providing customer and circuit correlation services on a real-time (e.g., sub-second) basis and to provide a topology layer to buffer the platform 101 from constant topology system changes. The module 155a queries for topology data and has the capability to subscribe to automatic updates as this information changes in the source systems. The topology services module 155a provides alarm to customer/circuit correlation and network topology for fault correlation/automation. This module 155a can interface with several network provisioning and configuration management systems to execution of the above functions.

The topology services module 155a can interconnect with the database (not shown) of the services portal 153b to allow access to the customer and circuit specific information (e.g., device/circuit, Public Switched Telephone Network (PSTN) dial-up number, customer data, and customer sensitivity notification level, etc.) in that repository. For example, the topology services module 155a can, in certain embodiments, populate the city, state, and country fields on the alarm so that flashes can be generated automatically. Also, the module 155a can add circuit identifier (ID) and customer name information to the alarms. Additionally, the topology services module 155a can obtain maintenance information from the repair management tier 157 to correlate reported alarms and maintenance events in progress.

The fault processing tier 155 also provides service restoration and outage management, including automatic service restoration for some network types and an interface into outage tracking and notification systems.

As part of the fault processing tier 155, the command factory module 155c also provides an interface to other applications and a common interface for all managed network devices. The command factory module 155c, in an exemplary embodiment, is a web-based application that provides users with generic command capabilities and remote access to network devices. For example, the command factory module 155c can provide access to transport switches, digital cross connects, frame relay switches, ATM switches, or private IP devices. Access to the devices can be controlled such that only personnel who are authorized to access network devices in their Area Of Responsibility (AOR) can do so. Command level security is supported to determine which users/groups can invoke specific generic commands.

The automation engine 155d and the workflow engine 155e provide ticketing, automation, and workflow services. For example, the automation engine 155d can automate many of the routine network operation center responsibilities. The engine 155d provides the capability to modify automation scenarios to quickly adapt to customer needs. The automation engine 155d provides an interface to the trouble management system of the repair management tier 157.

Workflow services are provided to the events created within the system, such as status tracking and correlation of "clear" status indication. The workflow engine 155e provides event management services, which enable multiple alarms to be associated to a single network event, and permit tickets to be opened via the trouble management system (as well as verification of the problem resolution).

Events created by the workflow engine 155e are the internal tracking mechanism for groups of related alarms (or network troubles). Each event can have an associated trouble ticket, such that the event can be configured to close that ticket when the network problem is resolved and the alarms are cleared. To efficiently address potential recurrence of the problem, timers can also be configured to hold events open for some period of time before they are closed.

The workflow engine 155e can create trouble tickets based on alarms from the real-time management and analysis module 153a and refer them to the testing system within the repair management tier 157 for processing. The workflow engine 155e can populate a trouble ticket symptom code with a code that corresponds to the alarm type being reported. Exemplary system codes include: IP down (e.g., router interface not responsive to PING), network connection down (e.g., connection within network has failed), interface down (e.g., failure of circuit between router and WAN), router down (e.g., failure of access circuit), etc. The engine 155e can also pass additional fields needed for circuit testing. According to various embodiments of the present invention, the workflow engine 155e can allow previously opened trouble tickets to be populated on the alarms within the system.

The fault processing tier 155 also provides network maintenance and change management services, including providing an interface to track network equipment maintenance to shield the operations centers from alarms that are generated from known maintenance activities. Additionally, the fault processing tier 155 supports event forwarding services. These services provide the ability to forward alarms out of the integrated network management platform 101 to external systems that may require the information.

The repair management tier 157 comprises a number of systems: a surveillance and operations system 157a, a maintenance and reporting system 157b, a testing system 157c, a trouble management system 157d, a resource manager 157e, and a customer portal 157f.

The maintenance and reporting system 157b provides a reporting system that is used to support managed services requirements based on data in services portal 153b and from events received from the managed customer networks. The system 157b provides a full services reporting environment including pre-defined and scheduled reports (supported by the testing system 157c), user defined reports, and ad-hoc reports.

By way of example, the customer portal 157f is a secure web portal service that provides an interactive experience for the managed services customer, including access to project and order status for site implementations, upgrades and other services, network inventory, procedures, circuit numbers, etc. The customer is also able to update their site contact information directly through the customer portal 157f. The customer portal 157f, in an exemplary embodiment, can utilize the same database as the services portal 153b. The customer portal 157f provides a GUI for customer access to the change management subsystem of the services portal 153b. The portal 157f can also support customer notifications of service problems, trouble tickets, status of trouble isolation, change request approvals, etc. In addition, the portal 157f can receive customer responses (e.g., acknowledgement or denial of ticket closure requests). Users can access graphical network topology views through the customer portal 157f. Further, the portal 157f has a reporting capability, whereby the users can obtain pre-defined and customized reports—e.g., scheduled reports and ad-hoc reports based on all data available through the customer portal 157f. The customer portal 157f also interfaces with the automation engine 155d for updates of the customer network problems and customer response confirmations on network testing and valid fault conditions.

The trouble management system 157d is integrated with the platform 101 to enable alarm to ticket creation workflow and tracking. The trouble management system 157d is utilized network operations centers (NOCs) (not shown) to document and track network and customer reported problems. The trouble management system 157d is also used for pro-active customer notifications based upon created tickets and notification criteria.

The testing system 157c, in an exemplary embodiment, provides the service provider with an intelligent, integrated, and easy-to-use circuit and element testing, and fault isolation product. The testing system 157c can be used to support newly installed circuits and to resolve customer reported (maintenance) problems. The testing system 157c supports automation features for performing automated fault isolation and testing initiated from the trouble management system 157d. Fault isolation involves gathering circuit topology information, accessing remote network elements (of the customer network 103) to retrieve real-time statistics, and performing intrusive testing.

The testing system 157c can then, for example, perform circuit based fault isolation and testing off of the generated trouble ticket. The testing system 157c can then add results from the circuit diagnosis as remarks to the trouble ticket for viewing by the user. In addition, the testing system 157c supplies the workflow engine 155e with ticket state (transition) updates as well as final remarks of the circuit test.

The testing system 157c updates the trouble ticket and refers the ticket back to the responsible organization or out to the LEC (Local Exchange Carrier) for resolution based on cause of the fault (e.g., via a fault isolation code). The testing system 157c, in real-time, updates the workflow engine 155e with testing status and final comments. The testing system 157c, according to one embodiment of the present invention, supports a graphical user interface (GUI). This GUI can be launched via the interface of the surveillance and operations system 157a.

By way of example, operation of the automation architecture 151 under an exemplary scenario, such as a CPE circuit failure, is explained as follows. While the automation operation is described as serial process, it is contemplated that the automation can occur in parallel and that multiple scenarios can be active at any one point in time. First, alarms are reported from the customer network 103 as well as the service provider's network equipment. These alarms are collected and analyzed by the real-time management and analysis module 153a, which analyzes the reported alarms via, for example, standard algorithms to determine the most likely source of the failure. Based upon this "root cause analysis," the module 153a produces a derived alarm, which identifies the failed circuit and CPE equipment, and communicates it to the fault processing tier 155. The fault handling module 155b stores the received alarm and determines which processes have "subscribed" to receive these alarms. The fault handling module 155b queries the topology services module 155a to obtain additional information relevant to network topology, customer information, and maintenance indication. This information is used to augment the derived alarm.

The automation engine 155d receives the derived alarm and matches the derived alarm contents with defined automation rules. Automation rules determine how an event will be handled based on observed conditions. The automation engine 155d can check an "Automation Eligible" flag to determine whether to proceed with the automation process. The flag can be set based on customer preference. If it is set to "true," automation continues; otherwise, the automation engine 155d does not perform any further action on this alarm. The automation engine 155d then opens a workflow event, which handles and acknowledges the alarm. Automation will then wait a configurable time period (e.g., 5 minutes). If the alarm is still outstanding after the configurable time period, the automation will continue. Otherwise the automation engine 155d closes the event and releases the alarm, removing it from the operator display. Thereafter, the alarm is communicated to the GUI of the surveillance and operations system 157a via the component interface of the fault handling module 155b. The derived alarm represented on the GUI can be marked as handled by the automation system, and used to enable personnel to examine the status of automated problem resolution at any requested time.

The automation engine 155d examines and matches the reported fault to a defined automation script. Assuming a match is found in this scenario, the automation engine 155d issues a query to the topology services module 155a for customer information, trouble handling procedures and any scheduled maintenance activity relative to the derived alarm from the real-time management and analysis module 153a. If no matching automation script is found to fit the reported fault, then the derived alarm of the automation engine 155d is declared "unhandled," which indicates that this fault requires manual intervention.

The topology services module 155a receives the request from the automation engine 155d and acts as the proxy in obtaining the necessary information from the services portal 153b (e.g., an enterprise services portal (ESP)) and communicates the acquired information back to the automation engine 155d. Alternatively, the topology information may have been previously acquired and stored, and subsequently updated on a periodic basis.

The automation engine 155d updates the workflow event with the acquired customer information. Additionally, the automation engine 155d checks the maintenance indicator on the alarms derived from the real-time management and analysis module 153a and determines if a maintenance event affecting this circuit is "active." If active, the automation engine 155d updates the event and derived alarms with "maintenance" indication and identification. The engine 155d employs automation script rules to determine subsequent actions, which could range from "no further action required" to "continuing with the corrective action automation." If no further action is indicated, the automation engine 155d will monitor the alarms for clearance and close the workflow event at that time. However, if a maintenance event is no longer active and the alarm persists, then the automation scenario continues.

According to an exemplary embodiment, the automation engine 155d requests the workflow engine 155e to determine whether an open trouble ticket already exists against the failed circuit. Next, the automation engine 155d requests the workflow component to either open a new ticket against an already open ticket or open a new ticket for the failed circuit. That is, if a ticket already existed, the original ticket can be linked to the new ticket. The information previously obtained from topology services module 155a and the network elements is used for creation of the ticket.

The alarm, along with the opened ticket and customer information, is handed off to NOC operations for further problem handling. Based upon scenario defined actions, the automation engine 155d queries the alarming network elements via the command factory (CF) component 155c based upon the derived alarms and obtains scenario defined outage confirmation and/or additional information. The command factory component 155c can utilize both in-band and out-of-band connectivity to perform interactions with network elements, including those on the customer network side. This information is updated in the workflow event.

The automation engine 155d invokes communication with the customer portal (CP) component 157f and requests information relative to the failed circuit and ticket number be placed in the affected customer's view. In addition, the automation engine 155d, according to one embodiment, can invoke a Common Object Request Broker Architecture (CORBA) "method" (defined within the trouble management system 157d) for proactive notification to the customer via service level agreement (SLA) agreed upon mechanisms, which include pager, email and cell phone text messaging, for example. Notifications to the customer are completed by the automation component requesting the trouble management system 157d to perform the notification. This information is obtained from the services portal 153b via a prior query from the topology services module 155a.

The automation engine 155d updates the workflow event with current time and status indicating the customer confirmation required. The automation engine 155a then waits for a period of time, as defined by an automation script, to enable customer approval of diagnostic or corrective actions to be taken by the service provider. It is contemplated the approval can be pre-arranged for certain actions, or conditions.

The customer can respond either directly via the customer portal 157f or indirectly via the network (or managed service) operations center (not shown) with the following: confirmation of outage and authorization for invasive testing (which can include a customer identified time window); and rejection of the outage and request for the service provider to ignore the failure (which could be caused by intentional activities at customer location). If the customer responds to the managed service operations center, then personnel updates the customer portal 157f with the confirmation or rejection information. The customer portal 157f can communicate the requested customer action back to the automation engine 155d for continuation of the automated actions.

The automation engine 155d re-activates, based upon either the received customer information from the customer portal 157f or the expiration of the scenario defined "wait" interval, and updates the workflow event of the time and automation status. If the customer "rejects" the failure, the automation engine 155d updates the previously created derived alarm indicating customer initiated activity. The opened trouble ticket turned over to the customer for resolution, and the automation scenario is terminated. The automation engine 155d closes the ticket and event upon alarm clearance. If the customer confirms or the time period expires, the automation engine 155d refers the ticket via, for example, CORBA defined methods of the trouble management system 157d to the testing system 157c for diagnosis activities. In one embodiment of the present invention, the customer can specify whether to allow testing.

The automation engine 155d and workflow engine 155e awaits notification from the testing system 157c of the results. The testing system 157c automatically receives the trouble ticket, and notifies the workflow engine 155e that fault diagnosis and testing has commenced. Based upon content within the ticket, the testing system 157c invokes additional network diagnostic activities. If circuit testing is required and authorized, the testing system 157c can, in certain embodiments, invoke the appropriate test and store the results in the ticket. The workflow engine 155e can update the event with time and status indicating that the testing system 157c has problem diagnosis in progress.

Based upon the diagnostic and test results, the testing system 157c performs the following. The testing system 157c uses the trouble management system 157d to refer the ticket out for action. In exemplary embodiment, using CORBA methods, the ticket is referred out to the appropriate "fix" organization. For example, for Field Repair actions, the ticket is referred to the resource manager component 157e via existing rules of the trouble management system 157d, which schedules the repair action.

For further problem analysis, the ticket can be referred to the appropriate operations group of the service provider or a third party. The testing system 157c then notifies the workflow engine 155e that diagnosis is complete and the ticket has been referred out. The workflow engine 155e updates the event with the time and refer-out action communicated by the testing system 157c. The automation engine 155d and workflow engine 155e await ticket updates received from the trouble management system 157d based upon resolution activities. Upon problem resolution, the ticket is referred back to the automation engine 155d.

In parallel with or prior to the above processes, the network elements reporting the original failure may issue "clear," which the real-time management and analysis module 153a maps to the original alarm and communicates an "alarm clear" condition to the automation engine 155d.

Consequently, the automation engine 155d receives the alarm clear indications and the refer-back notification from the trouble management system 157d and examines the status. If the ticket indicates that it is resolved and all of the reported workflow event alarms are in a "clear" state, then the automation engine 155d issues an update to customer portal 157f with status indicating the failure has been corrected. The ticket is placed on "customer time" via a standard trouble ticketing method.

The engine 155d then waits for expiration of an automation-scenario-defined customer time interval. If the trouble management system 157d indicates the ticket is resolved, or is on customer time, and the alarms are not clear, the automation engine 155d places the ticket back in the "To Be Worked" state, which is an indication to the engineer that they need to take some action.

Subsequently, the automation engine 155d terminates the automation process. Upon expiration of the customer time interval, the automation engine 155d updates the time and status in the event, and closes the ticket and the event.

The above exemplary scenario represents one of many automated fault handling "scripts." Each scenario generally follows the same sequence of steps with variances dependent upon the received network fault conditions; these processes are generalized in FIGS. 3A-3E. Further, the automation architecture 151 supports a variety of automation scenarios that are concurrently active and in differing states of completion at any one point in time.

Errors within the automation process (e.g., a failure to create an event) results in termination of the automated process and returning of the alarm to the user (e.g., network analyst, NOC engineer, etc.). Additionally the state of the event can be frequently updated to communicate the progress of the automation to the engineer.

As evident from the above description, the automation architecture 151 supports the use of rules for the workflow events. According to one embodiment of the present invention, the specification of rules associated with any given automation scenario or script can be definable and configurable via, for example, a desktop workflow "wizard." The defined rules and/or scripts of the wizard can, in some embodiments, be used by the automation engine 155d to determine and govern the actions to be taken for each alarm reported condition.

The automation architecture 151, as explained above, has a number of advantages, including rapid fault isolation, thereby permitting high network performance and reliability. Faults are not only isolated, but through automated scripts, appropriate tests are initiated across each test point across within the network and across various networks (including third parties). For instance, faults isolated to the local loop are automatically referred out to the local exchange carrier. Analysts are presented with a detailed analysis of what has transpired and can now escalate within the appropriate party. Customers are automatically notified when a trouble ticket is opened, and kept update as the status of the event changes, without requiring human intervention. The automation process also advantageously handles a multitude of alarm situations in parallel, and can gather pertinent information from various systems. Further, the system 100 can differentiate sequence of actions based on observed conditions, and take alternative actions when a subprocess (such as testing) is busy or unresponsive.

FIG. 1C illustrates the integrated network management platform 101 interacting with the trouble management system 111 for determining correlation between an alarm and a trouble ticket, according to an embodiment of the present invention. After receiving an alarm from the customer network 103, the platform 101 attempts to determine whether there is any correlation between the received alarm and existing trouble tickets. It is noted that the correlation can be with multiple trouble tickets. The platform 101 sends alarm information relating to the alarm to the trouble management system 111. In one embodiment, the trouble management system 111 utilizes a maintenance database 105 to store a log of outstanding trouble tickets (e.g., ticket 1-ticket N). Based on the alarm information, the trouble management system 111 generates a report of potentially relevant tickets. This trouble ticket information is then supplied to the trouble management system 111, which correlates the alarm with one or more of the trouble tickets. The alarm correlation process is more fully described with respect to FIG. 2B.

The fault isolation process is next described without regard to any particular type of alarm or causes of network failure or disruption in operation. It is recognized that the automation process can be readily adapted to accommodate any type of alarms and causes. Also, although the steps of the processes of FIGS. 2-7 are described in a sequential and ordered fashion, it is contemplated various steps can be performed concurrently, or otherwise executed out of the described sequence.

Figure 2A:
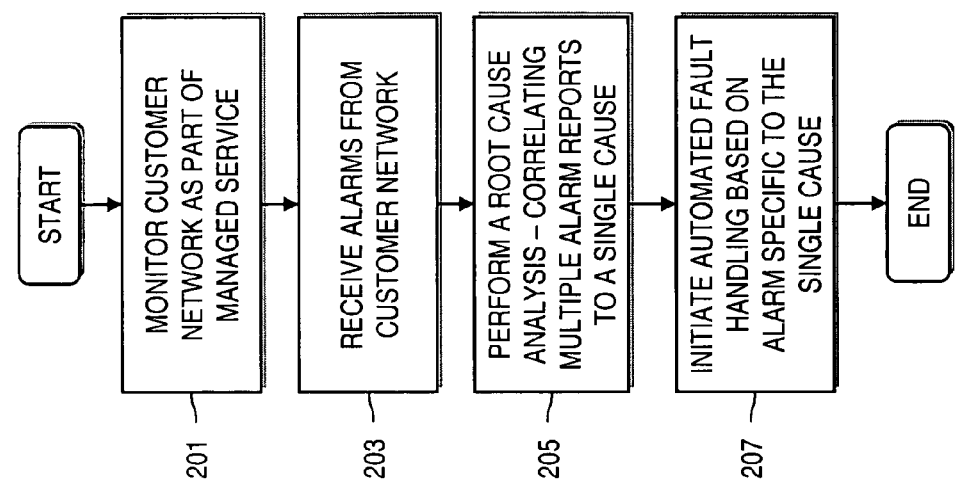
FIGS. 2A and 2B are flowcharts, respectively, of a fault isolation process performed as a managed service and of an alarm and trouble ticket correlation process used in the fault isolation process, according to various embodiments of the present invention.

FIG. 2A is a flowchart of a fault isolation process performed as a managed service, according to an embodiment of the present invention. In step 201, the customer network 103 is monitored by the service provider as a managed service, thereby eliminating the customer organization from the cost and burden of performing its own network monitoring and recovery. According to an exemplary embodiment, the real-time management and analysis module 153a within the fault analysis and elimination tier 153. Upon receiving alarms from the customer network 103, the real-time management and analysis module 153a performs a root cause determination, per steps 203 and 205. This module 153a can correlate multiple alarm reports to a single cause.

Once a root cause for the customer fault had been determined, an alarm specific to this cause is communicated to the fault handling module 155b for automated fault handling (step 207). The fault processing tier 155 gathers data via the topology services module 155a from topology sources and determines whether the alarm is associated with a maintenance event using the fault handling module 155b. If the alarm is occurring within a maintenance window, the alarm is updated with the maintenance information and subsequently used by the automation engine 155d.

Figure 2B:
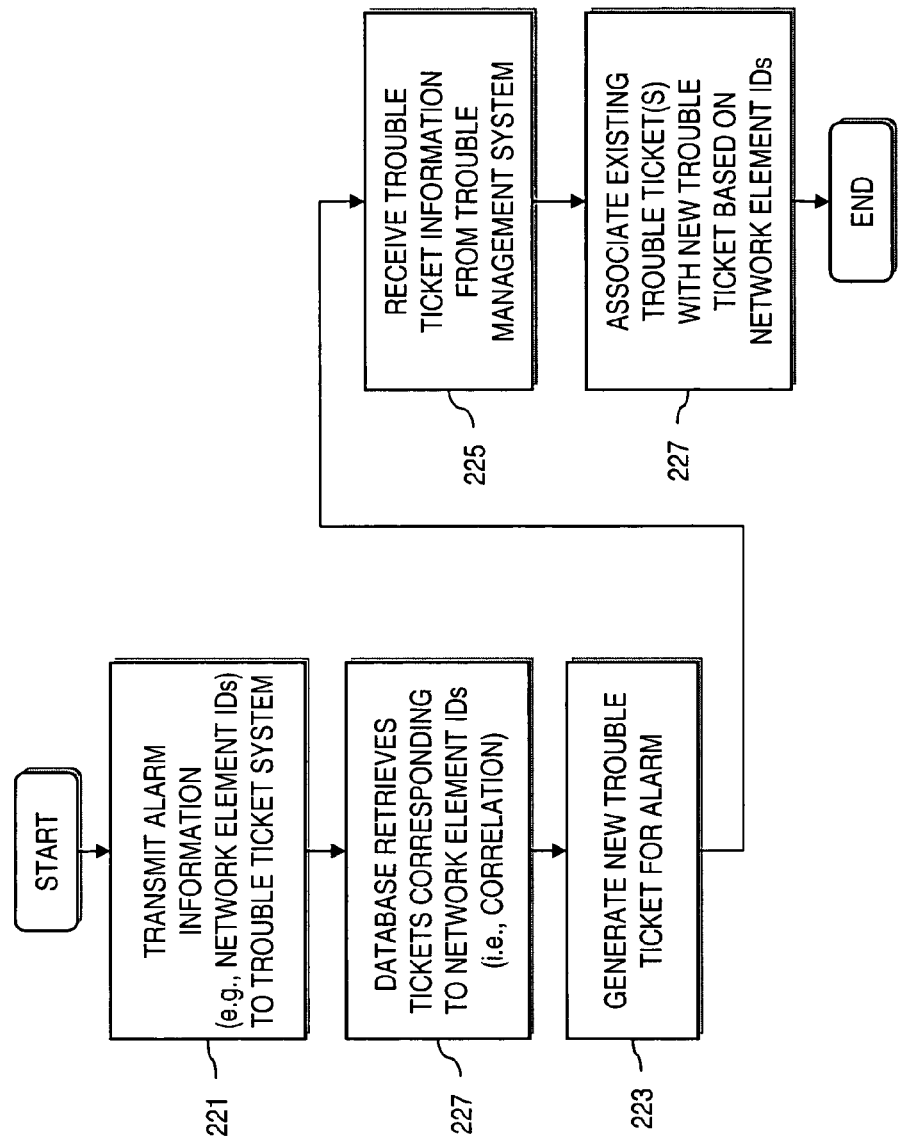

FIG. 2B shows a process for correlating an alarm with a trouble ticket, according to an embodiment of the present invention. As part of the automation process, the workflow engine 155e generates one or more workflow events corresponding to the alarm received from the customer network 103. In step 221, the integrated network management platform 101 consults with the trouble management system 111 by transmitting alarm information, via the automation engine 155d, to the trouble management system 111. In an exemplary embodiment, the alarm information includes identifiers of the affected network elements (i.e., network element IDs). This submission of network element IDs can be part of a query to the database 105. In turn, the database 105 retrieves, in step 223, trouble tickets that correspond to the specified network element IDs; this effectively correlates the alarm information with one or more existing trouble tickets (e.g., tickets 1 through N).

A new trouble ticket (per step 225) is created for the particular alarm. The trouble management system 111 returns information about these trouble tickets to the platform 101 (step 227). In step 229, the automation engine 155d associates the existing tickets with the newly created trouble ticket.

FIGS. 3A-3E are a flowchart of an automation process for fault handling, according to one embodiment of the present invention. The automation process begins when the alarms from the real-time management and analysis module 153a are passed to the automation engine 155d, per step 301. In step 303, a workflow event is created for a new customer outage alarm. Events are used to keep track of alarm status within the platform 101, and to serve as a container for holding one or more alarms related to a single network event.

The event can be viewed via a workflow GUI (e.g., supported by the surveillance and operation system 157a), thereby providing status on the automated alarm handling process, as in step 305. It is noted that the real-time management and analysis module 153a has the ability to send both the parent root cause alarm and the sympatheic children alarms. In one embodiment, the child alarms are not automated; however, if a child alarm is received, the automation engine 155d will attempt to associate that child alarm with the parent's and to add the child alarm to the event.

In step 307, the automation engine 155d adds the alarm to the created workflow event. Thereafter, in step 309, the Ticket Owning Group/Ticket Managing Group (TOG/TMG) is set for the ticket to be created. The TOG represents an operations group that is responsible for the ticket; this typically is the group that created the ticket. The TMG is the operations group that currently responsible for working the ticket. For example, the TOG and/or the TMG can be set specific to a NOC group and obtained from information provided by the services portal 153b. In an exemplary embodiment, the TOG and TMG can both be set based on the NOC group.

Next, the workflow event state is set to a Timed (TMD) Wait/Get Data state; this information can be accessed via the workflow GUI (step 311). In step 313, the process "waits" for a configurable period (e.g., 5 minutes) to ensure that the alarm stays active in the network before a ticket and other troubleshooting activities commence.

It is noted that during this waiting period, various background processes can occur. For instance, the trouble management system 157d can be consulted to determine whether an existing ticket for the same customer circuit and IP address is already in the ticketing system 157d. If an existing ticket is found, the ticket number is recorded; this information can be used during the ticketing phase of the automation. The services portal database is queried to obtain customer specific information associated with the alarm from the real-time management and analysis system 153a.

These tasks can also be performed in parallel. The configurable period can be set for the duration of the longest running task. According to an embodiment of the present invention, this period can be set based on the alarm type. At the end of the configurable period, the state of the workflow event and the alarm is checked as follows.

Figure 3A:
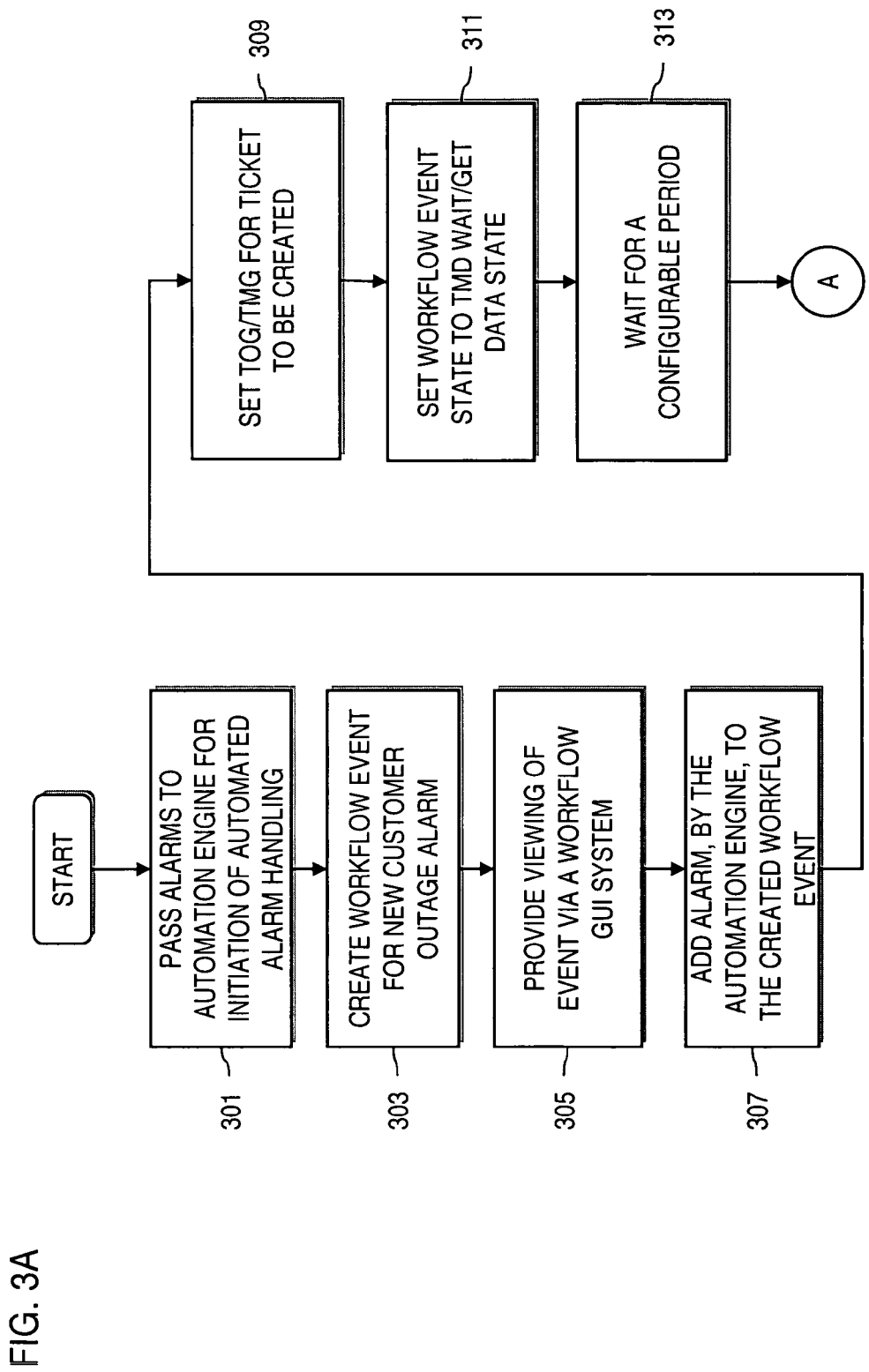
FIGS. 3A-3E are a flowchart of an automation process for fault handling, according to one embodiment of the present invention.
Figure 3B:
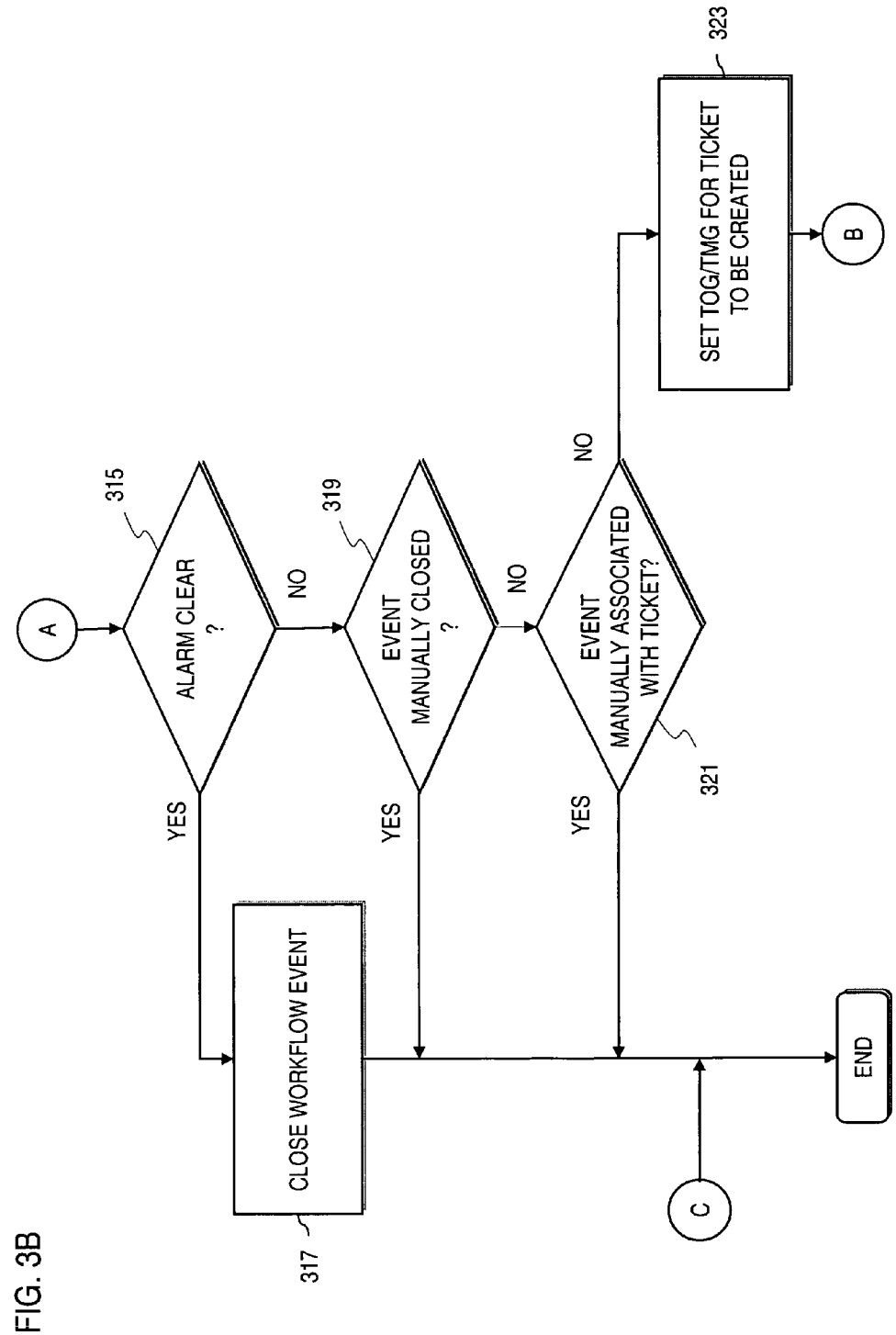

As shown in FIG. 3B, the process determines whether the alarm is clear, as in step 315. If the alarm is clear, the workflow event is closed (step 317), and the automation process ends. However, if the alarm is not clear, the event is checked to determine whether it has been manually closed (step 319). If the event has been closed, it is likely that the analyst does not want to continue with the automated handling of the alarm.

Upon determining that the event is not closed, the process examines whether the event is manually associated with a trouble ticket, per step 321. If the event has had a ticket associated with it, then the analyst has taken the necessary action to resolve the issues. Hence, the automation process ceases. If the workflow event is not associated with a trouble ticket, the TOG/TMG is set for the ticket that will be created (step 323).

Figure 3C:
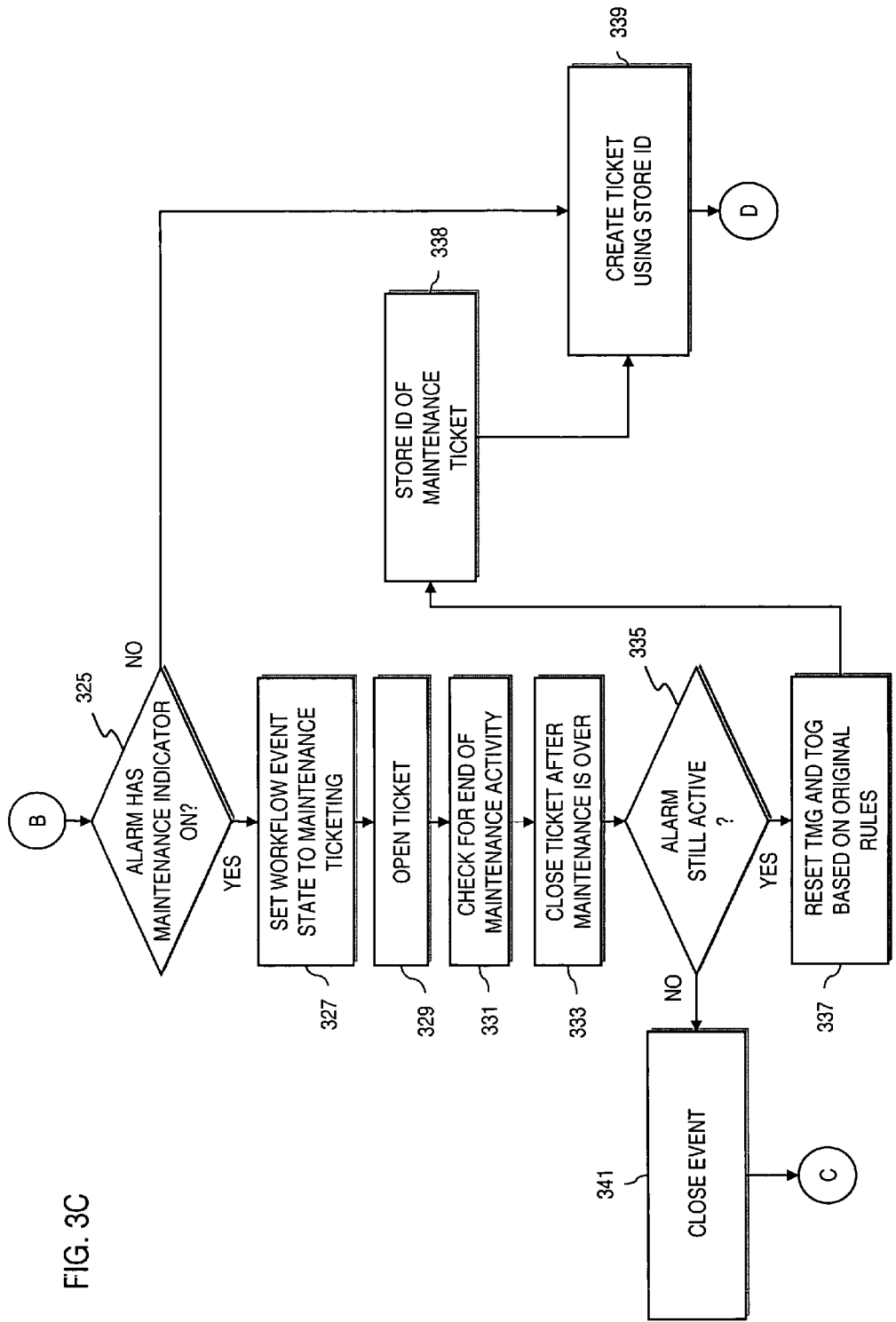

If the alarm is still active and none of the above conditions has occurred, the automation proceeds to the next step, as shown in FIG. 3C. The process examines, as in step 325, whether the alarm has a maintenance indicator, which specifies that the alarm is associated with a maintenance activity set by the surveillance and operations system 157a or the services portal 153b. If the indicator is set, then the workflow event is set to a maintenance ticketing state, per step 327.

Next, a trouble ticket for the alarm is open, per step 329. The trouble ticket can be opened with both the TMG and TOG set to the NOC group, for example. The process then waits for a predetermined duration (e.g., 5 minutes) to allow for system updates. Subsequently, in step 331, the process checks whether the maintenance activity has ended, and sets the workflow event state to "maintenance check." The process then re-queries the services portal 153b and surveillance and operations system 157a to determine if the alarm is still within the maintenance window. If so, this is monitored until the alarm exits from the maintenance activity; maintenance is over at this point. Thereafter, in step 333, the ticket is closed after the maintenance activity is completed. The ticket number is recorded.

At this point, the process checks whether the alarm is still active, per step 335. If the alarm is still active, the TMG and TOG parameters are re-set based on the original rules (step 337). In step 338, the maintenance ID (identifier) is stored. The process continues in which a new trouble ticket is created, as in step 339; the new trouble ticket can be associated with the stored maintenance ID, such that this ID can be "pasted" into the newly created ticket. If the alarm is not active, the event is closed, per step 341, and the automation process terminates.

With respect to the decision point 331, if the alarm is not within a maintenance activity, then the automation proceeds to the step of creating a new trouble ticket (step 339).

For the purposes of illustration, the trouble ticketing creation process is described with respect to interface ticketing and circuit ticketing; however, it is contemplated that any type of trouble ticket can be supported depending on the configuration and requirements of the customer networks 103.

Figure 3D:
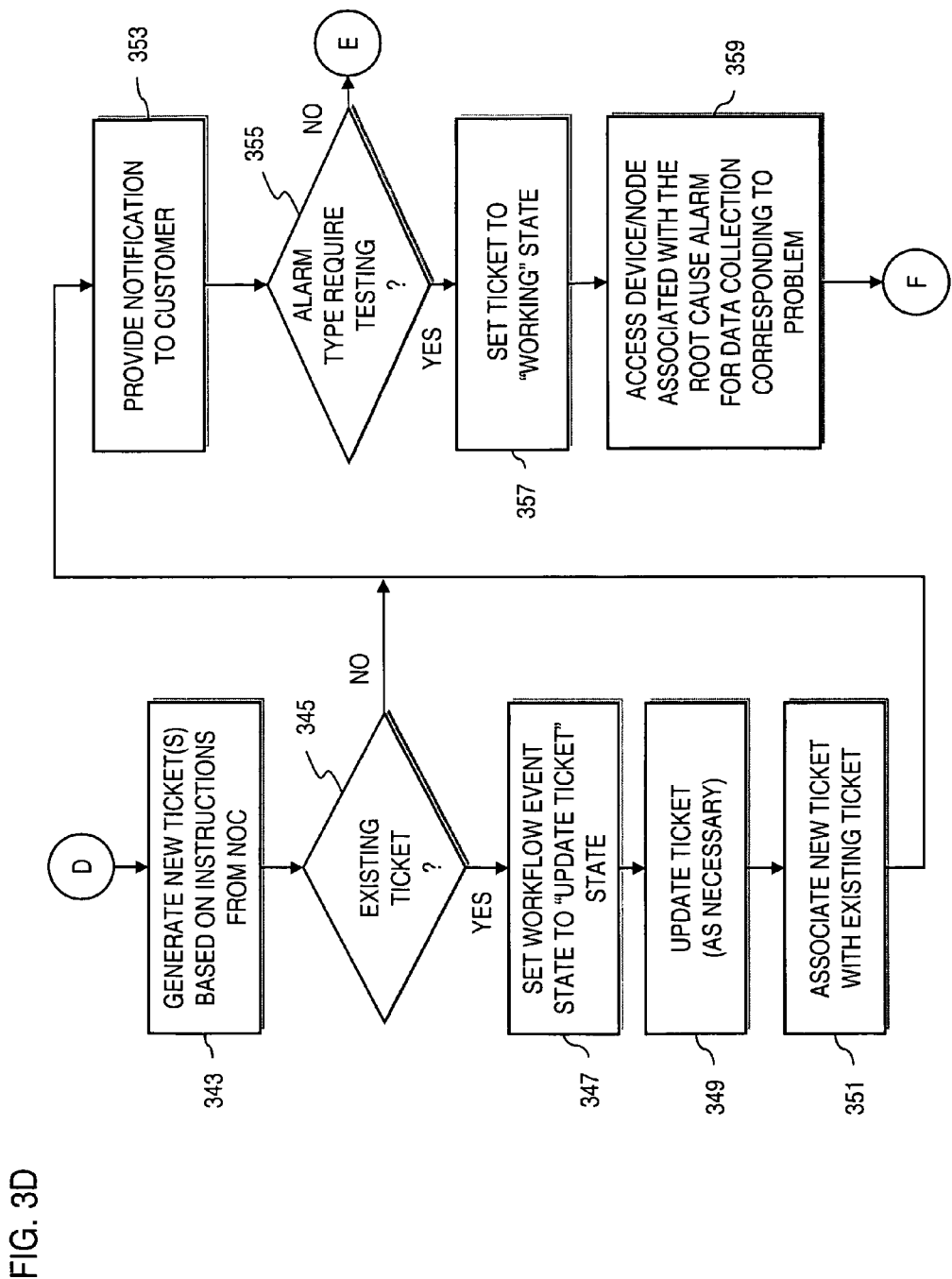
Figure 3E:
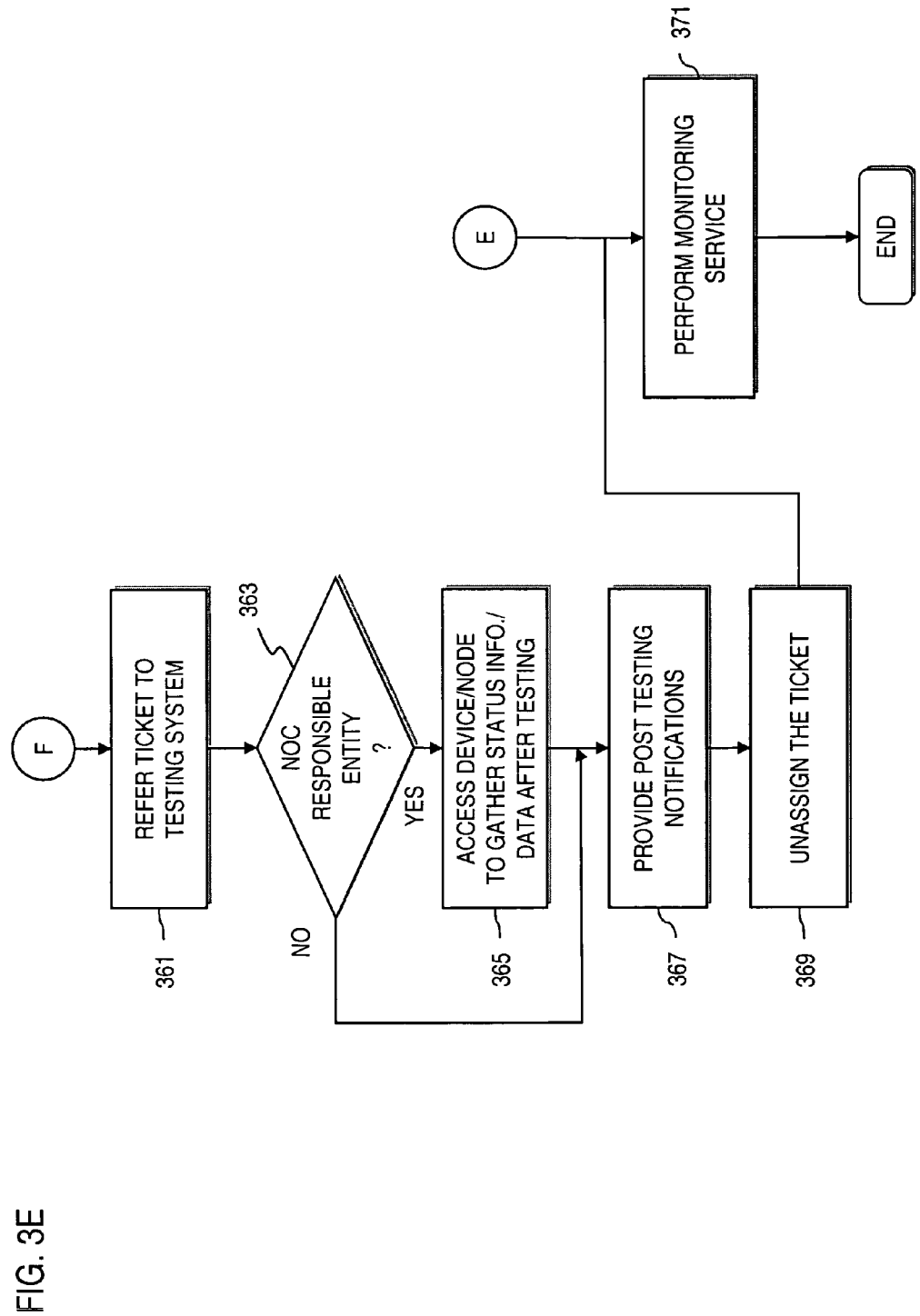

As shown in FIG. 3D, a new trouble ticket is generated based on information (or instructions) from the network operations center (NOC), per step 343. For example, if an interface ticket is required (as determined by the NOC), the event state is set to "interface ticketing," and an interface ticket is created. It is determined, as in step 345, whether a ticket is in existence. If a trouble ticket does exist, then the workflow event state is set to an "Update ticket" state (step 347). Next, the ticket can be updated with alarm information, as necessary (step 349).

This newly created interface ticket is then associated with the existing trouble ticket (step 351). Similarly, if a circuit ticket is needed, the workflow event is accordingly set to "circuit ticketing." The circuit ticket is created. Comments can be further associated with the ticket, particularly the circuit ticket, by setting the event to a "Ticket comments" state. The comments by a network analyst, for example, can be added to the trouble ticket—e.g., responses from the services portal 153b can be recorded on a ticket activity log of the subject ticket. This new circuit ticket is then associated with the existing trouble ticket.

If no existing ticket is found, new tickets can be generated as described above based on information (or instructions) from the NOC; however, because no ticket is associated with the alarm, updating is not necessary. It is noted that if this alarm was originally in a maintenance state (and as a result of the maintenance activity completing and the alarm is now going through the normal process), the new ticket will be updated with the ticket ID of the maintenance ticket that was created earlier. For example, if an interface ticket or a circuit ticket is required, the event state is respectively set to "interface ticketing" or "circuit ticketing" and the ticket is created. Comments can be further provided by the network analyst, as appropriate.

In step 353, the automation process sends notifications to the customer organization about the tickets. These notifications involve parsing out a list of all users to be notified, as well as the methodology (e.g., email, page, voice, etc.) for receiving these notifications. Additionally, these notifications can be based on the roles of these users. For instance, a contact with supervisory role can be notified of more severe alarms as part of an escalation process.

Next, in step 355, it is determined whether the alarm is of a type that requires testing. If the alarm type is not one of the specifically supported alarms that require testing, the process performs a monitor service, as more fully described below.

However, if testing is required, the ticket is set to a "working" state to indicate that the automation process is handling the ticket (step 357). At this point, the device associated with the root cause alarm is accessed, as in step 359. The process issues data retrieval commands, via the command factory 155c, to gather data on the problem.

Thereafter, the ticket is referred to the testing system 157c, per step 361. The process then determines, as in step 363, whether the NOC is the responsible entity. If so, the automation process again accesses the device associated with the root cause alarm and issues the necessary data retrieval commands to obtain status data after the testing system 157c has performed testing to resolve the problem (step 365). Alternatively, these commands can be issued before testing, depending on the requirements of the NOC. In step 367, the process provides post testing notifications to the users. At this stage, the ticket is unassigned, and the process proceeds to perform the monitoring service (steps 369 and 371).

Figure 4:
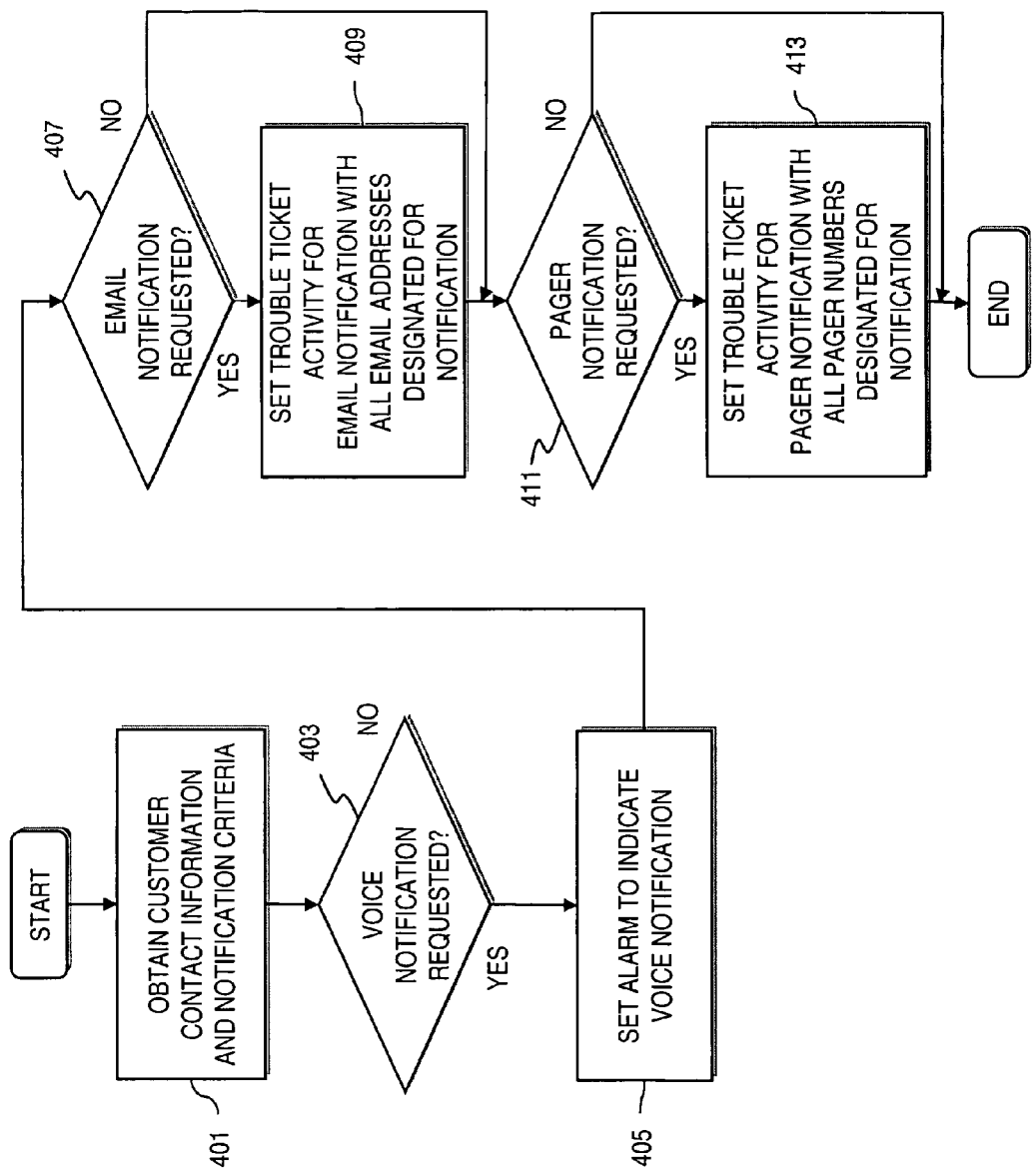
FIG. 4 is a flowchart of a notification process, according to an embodiment of the present invention.

FIG. 4 is a flowchart of a notification process, according to an embodiment of the present invention. The notification process begins with obtaining the customer contact information and any notification criteria that the customer has specified regarding who, how, and when notifications are to be supplied (step 401). Assuming the customer notification feature is enabled for a user and the alarm is of a type that affects network services, these notifications are supplied via voice, email or pager, according to one embodiment of the present invention. If voice notification is requested as determined in step 403, the alarm is set to indicate voice notification (as in step 405).

Per steps 407 and 409, if email notification is requested, the trouble ticket activity is configured for email notification with all email addresses designated for notification. Likewise, if pager notification is desired, the trouble ticket activity is set for pager notification with all pager numbers designated for notification (steps 411 and 413).

The automation process is capable of waiting for a response or instructions from the contact for a certain configurable duration. For instance, with pager notification, the user receives notification text, and provides a text response to the workflow engine 155e, which then acts appropriately to resolve the alarm.

Figure 5:
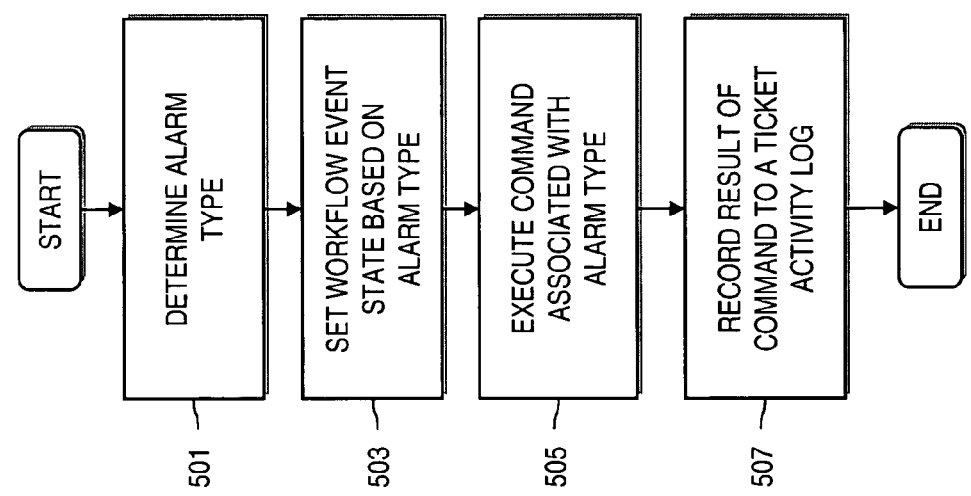
FIG. 5 is a flowchart of a data collection process, according to one embodiment of the present invention.
Figure 6A:
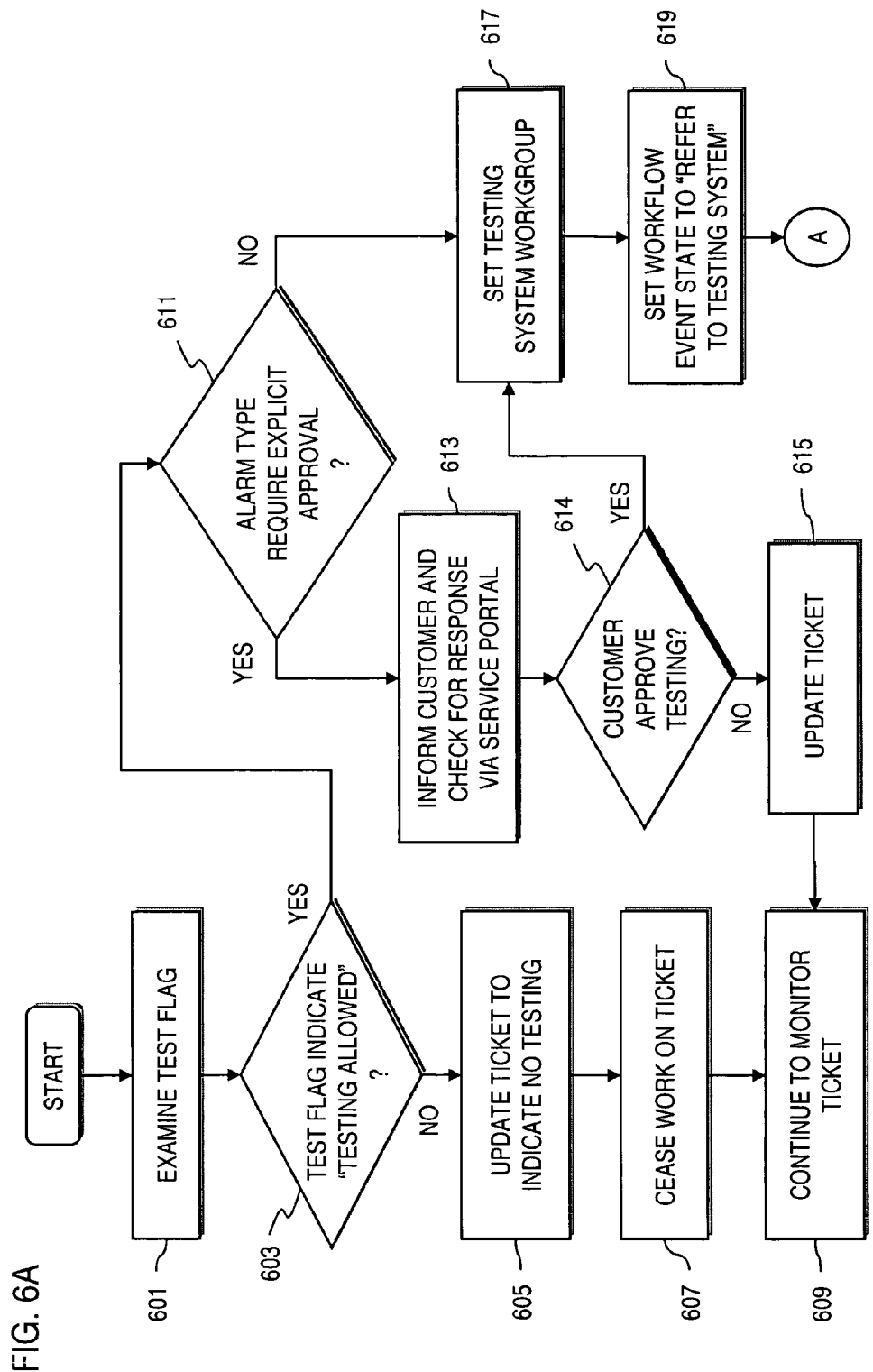
FIGS. 6A-6D are a flowchart of a process for fault testing, according to an embodiment of the present invention.
Figure 6B:
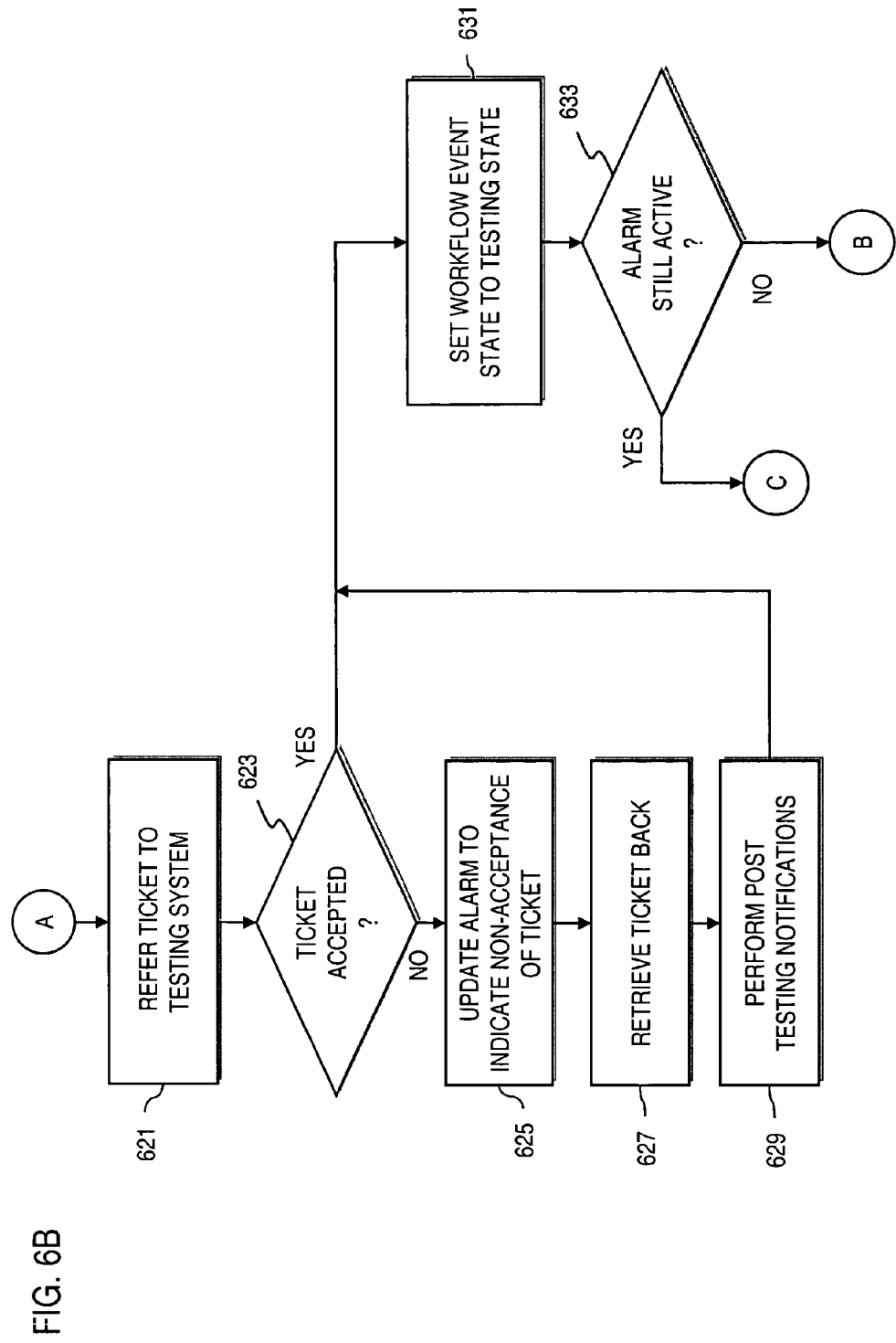
Figure 6C:
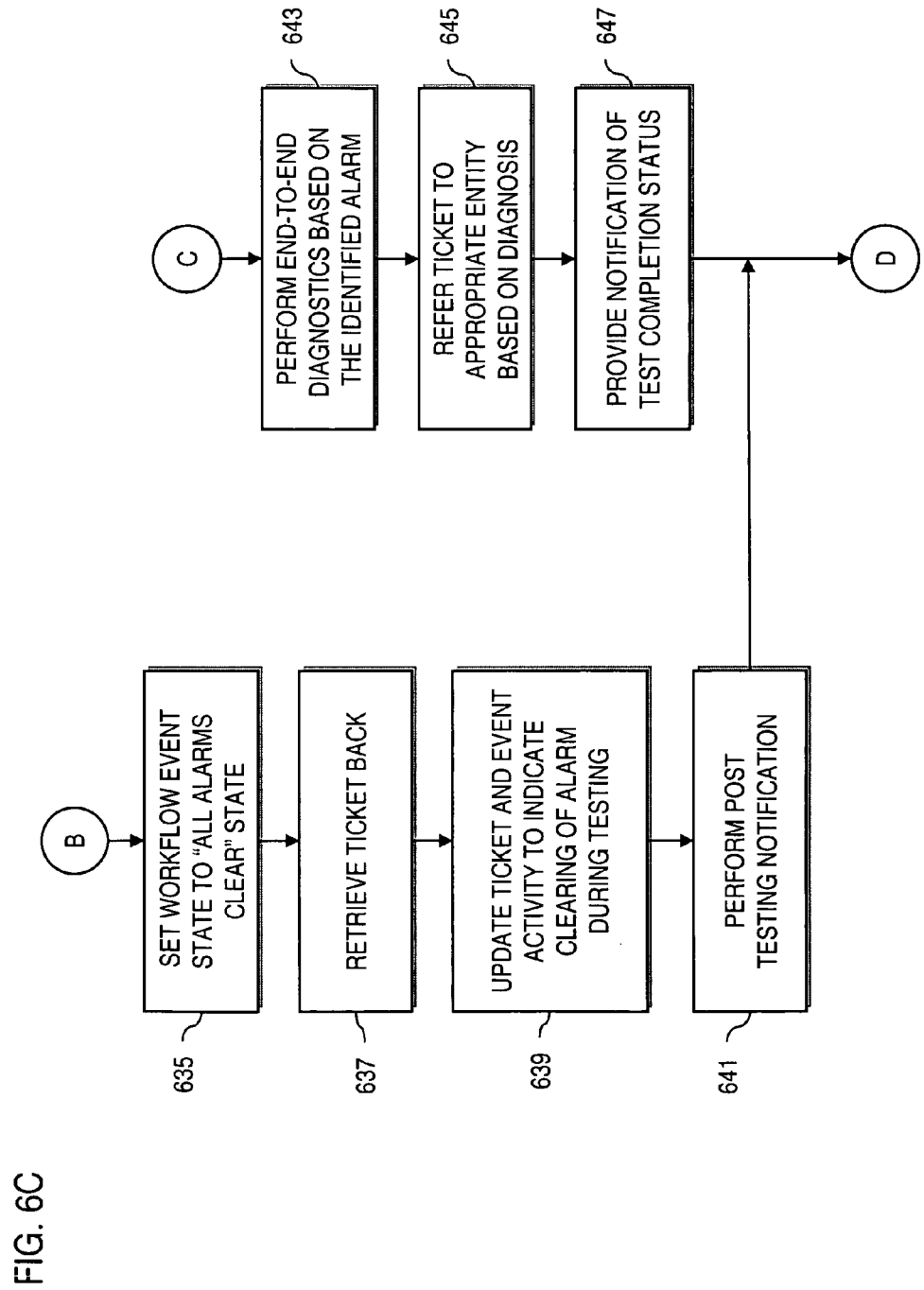
Figure 6D:
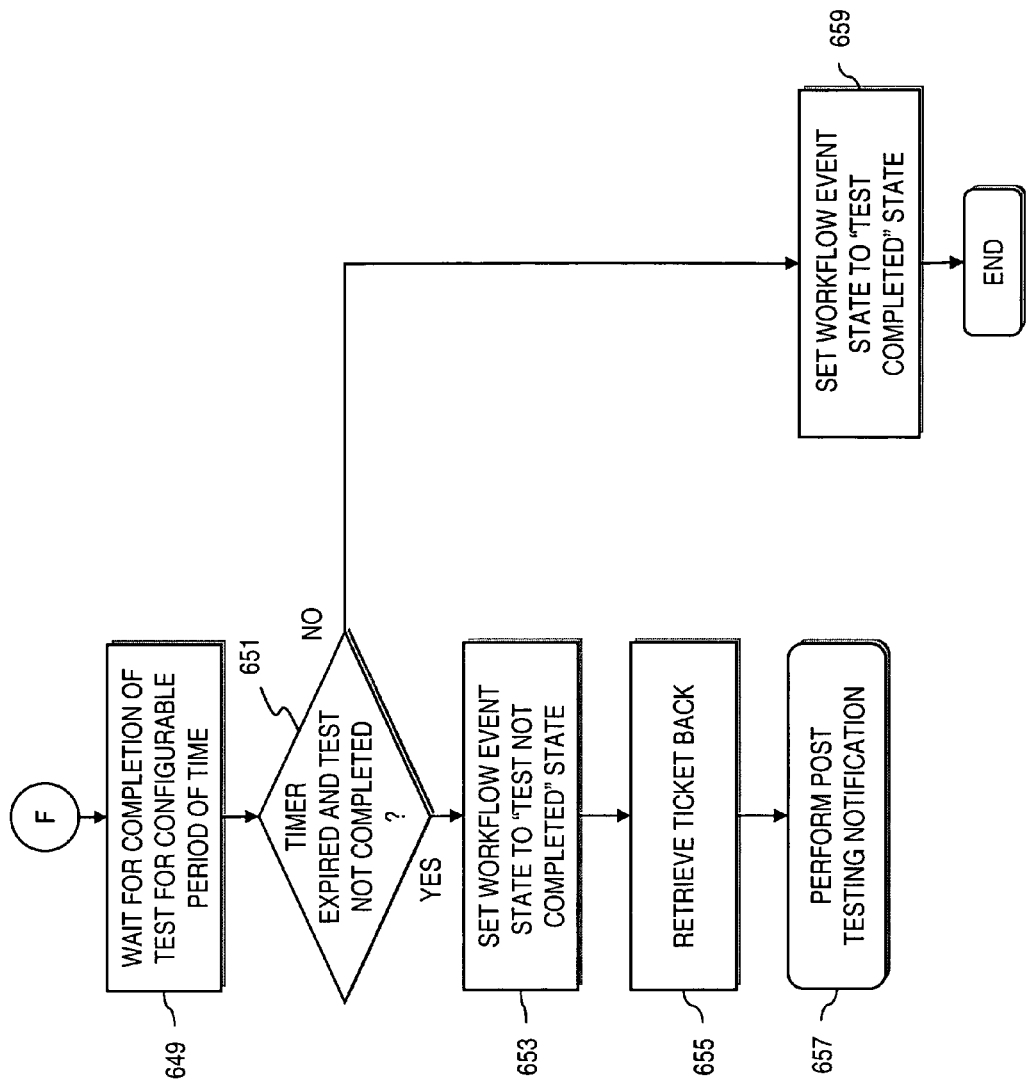

FIG. 5 is a flowchart of a data collection process, according to one embodiment of the present invention. In step 501, the alarm type is determined, and the workflow event state is set based on this determined type (step 503). Next, a command associated with the alarm type is issued by the command factory 155c and is executed, as in step 505. The result of the command is recorded to a ticket activity log, per step 507. By way of example, if the alarm type is "Router Down" (i.e., router component has failed), the event state is set to "Issuing CF commands for Router Down." It is contemplated that various alarm types can be utilized, including "Interface down" to indicate that an interface of a network component has failed, and "IP down" to indicate a problem with the IP addressing, for example.

FIGS. 6A-6D are a flowchart of a process for fault testing, according to an embodiment of the present invention. The fault testing process begins with examining the test flag, as in step 601, and determining whether the flag is set to indicate that no testing is required (step 603). If the flag is set to false, then the ticket is updated to indicate "no testing," per step 605. Work on the ticket is ceased, as in step 607. This alerts the NOC that the automation process is no longer working on the ticket. In step 609, the process continues to monitor the ticket (step 609).

Back in step 603, if the ticket is not set to false, then the automation process determines whether the alarm type is of a pre-specified type, per step 611. Next, in step 613, the process checks whether the services portal 153*b* has a response to the alarm. In step 614, the process determines whether the testing has been approved by the customer. In an exemplary embodiment, the customer can pre-authorize certain testing; however, if the testing is unusual (as defined and specified by the customer) or can significantly impact the customer's operations, then testing is likely to require approval beyond the pre-authorized testing scenarios.

In step 615, the ticket is updated accordingly. For example, if the alarm type is Interface Logical Connection Down or IP Down, in the case of a frame relay network, the automation process checks for the connection identifier (e.g., Data Link Connection Identifier (DLCI)) in the response from the services portal 153*b*. The event can thus be updated to indicate that no DLCI is provided. Thereafter, the process returns to the monitoring step 609.

Next, a working group of the testing system 157*c* is set (step 617). The workflow event state, as in step 619, is set to "Refer to Testing System." The automation process accordingly refers the ticket to the testing system 157*c* for handling, per step 621 (shown in FIG. 6B), and waits for a configurable duration for the system 157*c* to accept the ticket. If the ticket is not accepted (as determined in step 623), the alarm is updated to indicated non-acceptance of the ticket, as in step 625. The automation process then retrieves the ticket back for handling, per step 627. At this point, the process proceeds, as in step 629, to perform post testing notifications. This notification process is similar to that of FIG. 4, with information relating to testing being provided. Next, in step 631, the workflow event is set to a "Testing" state.

At this juncture, the automation process determines whether the alarm is still active, as in step 633. If the alarm is not active, the workflow event state is set to "All Alarms Clear" state (step 635). The ticket is taken back, per step 637, by the automation process from the testing system 157*c*. Thereafter, both the ticket and the event activity are updated to indicate that the alarm was cleared during testing, as in step 639. In step 641, the post testing notification is performed.

In the scenario whereby the alarm is still active, end-to-end diagnostics are performed based on the identified alarm, such as an alarm circuit (step 643). This testing can determine whether the problem is internal to the customer network 103, within a third party provider (not shown) or the service provider network. In step 645, the ticket is referred to an appropriate entity based on the diagnosis to repair or otherwise remedy the problem. Also, notification is provided to indicate completion of the test (step 647).

In parallel to the above steps 643-647, the automation engine 155*d* can wait, as in step 649, for a configurable period of time (e.g., up to 60 minutes for the testing system 157*c* to complete the test), as set by a timer, for example. If the timer expires and the test is not completed (as determined in step 651), the workflow event state is set to "Test Not Completed," as in step 653. The process retrieves the ticket from the testing system 157*c*, as in step 655. In step 657, the automation engine 155*d* performs post testing notification. In step 659, the workflow event state is set to "Test Completed."

Figure 7:
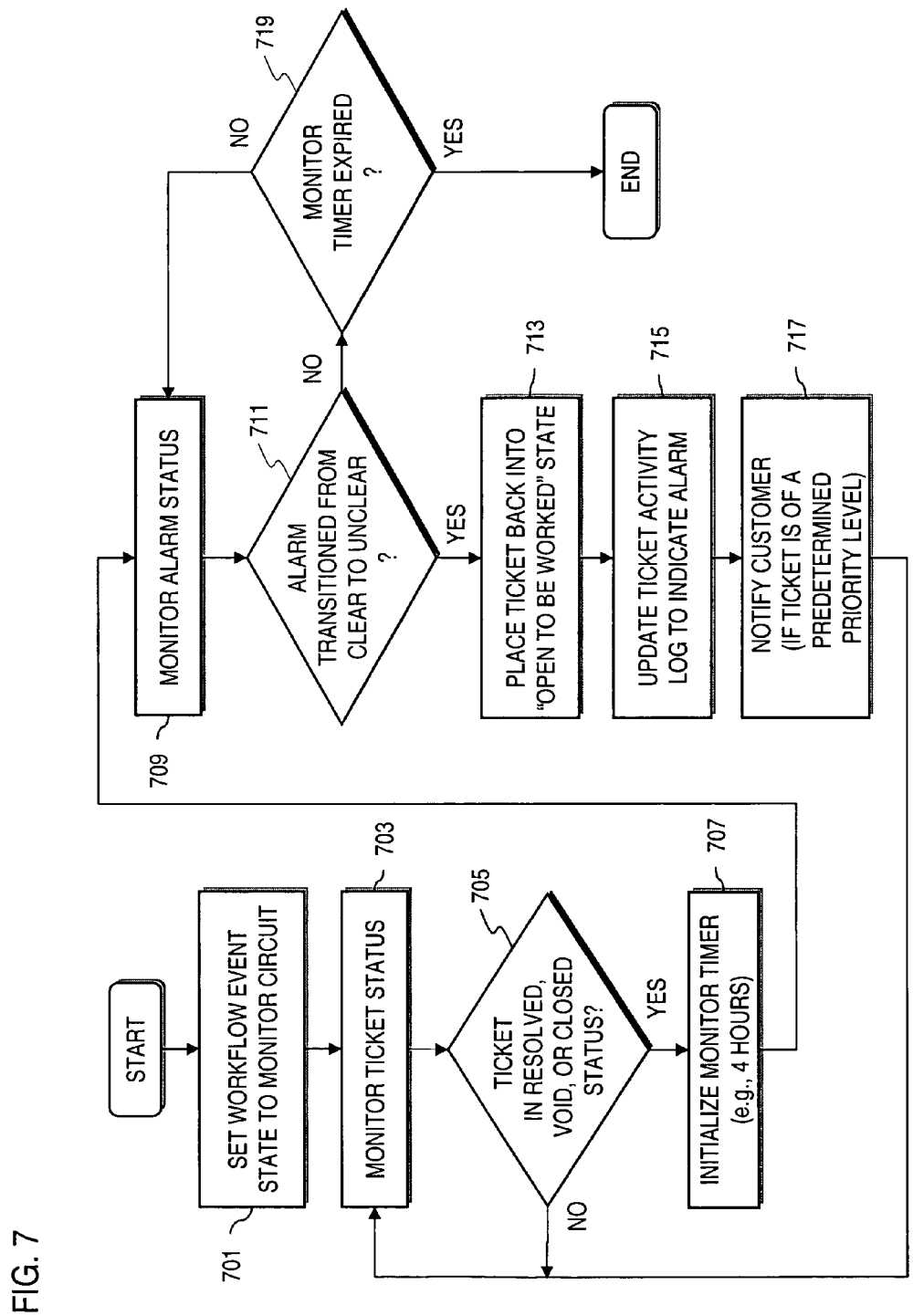
FIG. 7 is a flowchart of a process for network monitoring, according to an embodiment of the present invention.

FIG. 7 is a flowchart of a process for network monitoring, according to an embodiment of the present invention. As for the monitoring service, the workflow event state is set to "Monitor Service" (step 701). The ticket is then monitored, per step 703. This monitoring can be executed on a periodic basis (e.g., every 2 minutes), until the status of the ticket is either resolved, void, or closed, as determined in step 705. In step 707, a timer for the monitoring process is initialized; the value of this monitor timer can be set based on historical data relating to the duration of the associated activities (e.g., 4 hours) for resolving the ticket.

In step 709, the alarm status is monitored. Thereafter, it is determined whether the alarm transitioned from a "Clear" state to an "Unclear" state (step 711). If the ticket is undergoing the monitor service and the alarm moves from the Clear state to the Unclear state, then the ticket is placed back into the "Open to be Worked" state, as in step 713. Next, the ticket activity log is updated, as in step 715, accordingly to indicate that the ticket is now being worked on.

At this stage, the process can access the services portal 153*b*, per step 717, to obtain the customer contacts (in case the contacts have changed) for sending out notifications. Such notifications can be based on any number of triggers—e.g., time, events, rules, etc. For example, the customer contact can be notified if the ticket is a "high" priority (or whatever priority setting specified by the customer). The notification process can follow that of FIG. 4.

The process determines whether the monitor timer has expired, per step 719. If the timer has not lapsed, the monitoring process continues (returns to step 709).

One of ordinary skill in the art would recognize that the processes for automated fault isolation and/or recovery may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 8:
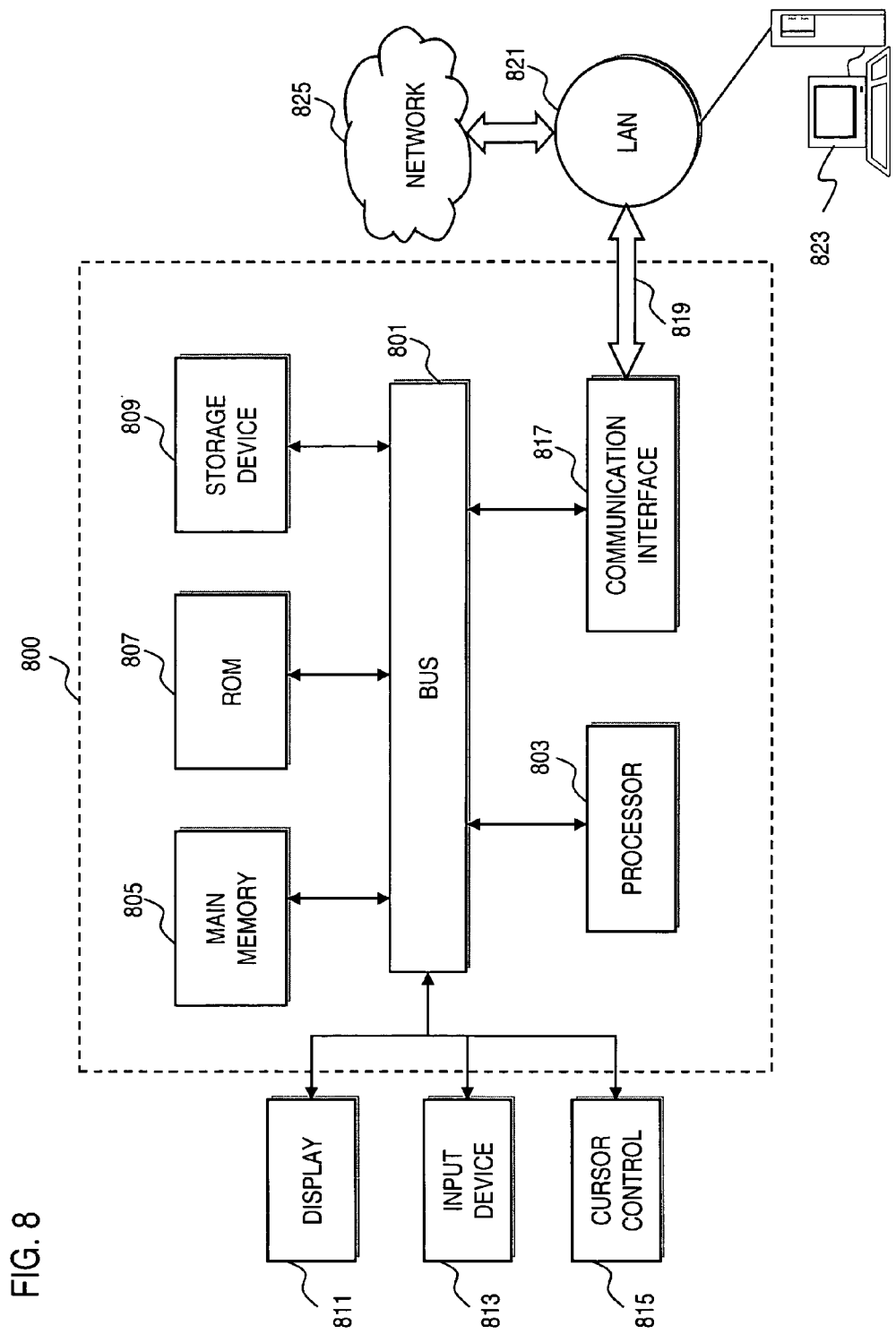
FIG. 8 is a diagram of a computer system that can be used to implement an embodiment of the present invention.

FIG. 8 illustrates a computer system 800 upon which an embodiment according to the present invention can be implemented. For example, the processes of FIGS. 2A-2C and 4-9 can be implemented using the computer system 800. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to one embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the present invention. Thus, embodiments of the present invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communications network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the present invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

The following patent applications are incorporated by reference in their entireties: co-pending U.S. patent application Ser. No. 11/318,077 filed Dec. 23, 2005, entitled "Method and System for Providing Automated Fault Isolation in a Managed Services Network"; co-pending U.S. patent application Ser. No. 11/317,893 filed Dec. 23, 2005, entitled "Method and System for Providing Automated Data Retrieval in Support of Fault Isolation in a Managed Services Network"; co-pending U.S. patent application Ser. No. 11/318/088 filed Dec. 23, 2005, entitled "Method and System for Processing Fault Alarms and Maintenance Events in a Managed Network Services System"; and co-pending U.S. patent application Ser. No. 11/318/078 filed Dec. 23, 2005, entitled "Method and System for Controlling Customer Contact Data in a Managed Network Services System."

While the present invention has been described in connection with a number of embodiments and implementations, the present invention is not so limited but covers various obvious modifications and equivalent arrangements, which fall within the purview of the appended claims. Additionally, the features of the present invention can be combined in a numerous combinations and permutations, in which the appended claims are illustrative in nature.

APPENDIX

Acronyms:
AOR Area Of Responsibility
API Application Programming Interface
ATM Asynchronous Transfer Mode
CD-ROM Compact Disc-Read Only Memory
CDRW Compact Disc Read-Writable
CORBA Common Object Request Broker Architecture
CP Customer Portal
CPE Customer Premises Equipment
DIY Do-It-Yourself
DLCI Data Link Connection Identifier
DSP Digital Signaling Processing
DVD Digital Versatile Disc (formerly Digital Video Disc)
EPROM Electrically Programmable Read-Only Memory
ESP Enterprise Services Portal
GUI Graphical User Interface
IP Internet Protocol
IR Infrared
ID Identifier
IP Internet Protocol
J2EE JAVA® 2 Enterprise Edition
LAN Local Area Network
LEC Local Exchange Carrier
NOC Network Operations Control
ORB Object Request Broker
PCMCIA Personal Computer Memory Card International Association
PDA Personal Digital Assistant
PROM Programmable Read-Only Memory
PSTN Public Switched Telephone Network
RAM Random Access Memory
RF Radio Frequency
SLA Service Level Agreement
TMG Ticket Managing Group
TOG Ticket Owning Group
USB Universal Serial Bus
WAN Wide Area Network
XML eXtensible Mark-up Language

What is claimed is:

1. A method for providing automated fault isolation, the method comprising:
receiving an alarm indicative of a fault within a customer network;
creating an event within a workflow in response to the alarm, wherein a new trouble ticket is generated as part of the workflow;
communicating with a trouble management system to correlate the alarm with an existing trouble ticket; and
associating the new trouble ticket with the existing trouble ticket;
notifying a customer of the customer network of the new trouble ticket;
matching, via at least one processor, contents of the alarm with defined automation rules;
determining, via the automation rules, how the at least one fault will be repaired based on observed conditions;
determining, via the at least one processor, whether to proceed with the automation process, based on a flag set in accordance with a customer preference;
if the automation process is determined to proceed, opening a workflow event corresponding to the at least one alarm, for automatically resolving the at least one fault;
waiting a configurable time period;
if the derived alarm is outstanding after the configurable time period, continuing with the automation process, and, if the derived alarm is not outstanding, after the configurable time period, closing the workflow event and releasing the derived alarm by removing it from a user display;
updating status of the new trouble ticket; and
transmitting the updated status to the customer.

2. A method according to claim 1, wherein the customer network includes one or more network elements, further comprising:
monitoring the network elements to provide end-to-end visibility for resolving the fault.

3. A method according to claim 2, further comprising:
automatically initiating testing of the network elements to further isolate the fault.

4. A system for providing automated fault isolation, the system comprising:
at least one processor; and
at least one memory including computer program code for one or more programs, the at least one memory and the computer program code configured to, with the at least one processor, cause the system to perform at least the following:
receive an alarm indicative of a fault within a customer network; and
create an event within a workflow in response to the alarm, wherein a new trouble ticket is generated as part of the workflow, the system being further configured to communicate with a trouble management system to correlate the alarm with an existing trouble ticket, and to associate the new trouble ticket with the existing trouble ticket;
notify a customer of the customer network of the new trouble ticket;
match contents of the alarm with defined automation rules;
determine, via the automation rules, how the at least one fault will be repaired based on observed conditions;
determine whether to proceed with the automation process, based on a flag set in accordance with a customer preference;
if the automation process is determined to proceed, open a workflow event corresponding to the at least one alarm, for automatically resolving the at least one fault;
wait a configurable time period;
if the derived alarm is outstanding after the configurable time period, continue with the automation process, and, if the derived alarm is not outstanding, after the configurable time period, close the workflow event and release the derived alarm by removing it from a user display;
update status of the new trouble ticket; and
transmit the updated status to the customer.

5. A system according to claim 4, wherein the customer network includes one or more network elements, the system being further configured to monitor the network elements to provide end-to-end visibility for resolving the fault.

6. A system according to claim 5, wherein the system is further configured to automatically initiate testing of the network elements for recovery of the fault.

7. A method for providing automated fault isolation, the method comprising:

receiving alarm information, from an automated system, associated with an alarm indicative of a fault within a customer network, the automated system being configured to create an event within a workflow in response to the alarm and to generate a new trouble ticket as part of the workflow;

retrieving an existing trouble ticket among a plurality of existing trouble tickets based on the alarm information; and transmitting information about the existing trouble ticket to the automated system to correlate the alarm with the existing trouble ticket, wherein the automated system is further configured to associate the new trouble ticket with the existing trouble ticket;

notifying a customer of the customer network of the new trouble ticket;

matching, via at least one processor, contents of the alarm with defined automation rules;

determining, via the automation rules, how the at least one fault will be repaired based on observed conditions;

determining, via the at least one processor, whether to proceed with the automation process, based on a flag set in accordance with a customer preference;

if the automation process is determined to proceed, opening a workflow event corresponding to the at least one alarm, for automatically resolving the at least one fault;

waiting a configurable time period;

if the derived alarm is outstanding after the configurable time period, continuing with the automation process, and, if the derived alarm is not outstanding, after the configurable time period, closing the workflow event and releasing the derived alarm by removing it from a user display;

updating status of the new trouble ticket; and transmitting the updated status to the customer.

8. A method according to claim 7, wherein the customer network includes one or more network elements, the automated system being further configured to monitor the network elements to provide end-to-end visibility for resolving the fault.

9. A method according to claim 8, wherein the automated system is further configured to automatically initiate testing of the network elements for recovery of the fault.

10. A system for providing automated fault isolation, the system comprising:

a communication interface configured to receive alarm information, from an automated system, associated with an alarm indicative of a fault within a customer network, the automated system being configured to create an event within a workflow in response to the alarm and to generate a new trouble ticket as part of the workflow; and a processor configured to retrieve an existing trouble ticket among a plurality of existing trouble tickets based on the alarm information, wherein information about the existing trouble ticket is transmitted to the automated system to correlate the alarm with the existing trouble ticket, and the automated system is further configured to associate the new trouble ticket with the existing trouble ticket;

and the automated system is further configured to:

notify a customer of the customer network of the new trouble ticket, match contents of the alarm with defined automation rules;

determine, via the automation rules, how the at least one fault will be repaired based on observed conditions;

determine whether to proceed with the automation process, based on a flag set in accordance with a customer preference;

if the automation process is determined to proceed, open a workflow event corresponding to the at least one alarm, for automatically resolving the at least one fault;

wait a configurable time period;

if the derived alarm is outstanding after the configurable time period, continue with the automation process, and, if the derived alarm is not outstanding, after the configurable time period, close the workflow event and release the derived alarm by removing it from a user display;

update status of the new trouble ticket; and transmit the updated status to the customer.

11. A system according to claim 10, wherein the customer network includes one or more network elements, the automated system being further configured to monitor the network elements to provide end-to-end visibility and to generate a new trouble ticket as part of the workflow.

12. A system according to claim 11, wherein the automated system is further configured to automatically initiate testing of the network elements to further isolate the fault.

* * * * *